US012383955B2

(12) United States Patent
Said et al.

(10) Patent No.: US 12,383,955 B2
(45) Date of Patent: Aug. 12, 2025

(54) PRODUCTS USING GOLD AND SILVER NANOPARTICLES AND IONS TO ABSORB VISIBLE AND UV LIGHT

(71) Applicant: Rise Nano Optics Ltd., Haifa (IL)

(72) Inventors: Inas Saleh Said, Haifa (IL); Nabil Jadaon, Nazareth llit (IL); Musa Abu-Hilu, Upper Galilee (IL)

(73) Assignee: Rise Nano Optics Ltd., Haifa (IL)

( * ) Notice: Subject to any disclaimer, the term of this patent is extended or adjusted under 35 U.S.C. 154(b) by 967 days.

(21) Appl. No.: 17/047,420

(22) PCT Filed: May 8, 2019

(86) PCT No.: PCT/IB2019/053773
§ 371 (c)(1),
(2) Date: Oct. 14, 2020

(87) PCT Pub. No.: WO2019/215630
PCT Pub. Date: Nov. 14, 2019

(65) Prior Publication Data
US 2021/0116617 A1    Apr. 22, 2021

Related U.S. Application Data

(60) Provisional application No. 62/668,278, filed on May 8, 2018.

(51) Int. Cl.
*G02B 5/20* (2006.01)
*B22F 1/054* (2022.01)
(Continued)

(52) U.S. Cl.
CPC ............ *B22F 1/0547* (2022.01); *B22F 1/065* (2022.01); *B22F 9/24* (2013.01); *C03C 17/007* (2013.01);
(Continued)

(58) Field of Classification Search
CPC .......... G02B 5/20; G02B 5/206; G02B 5/208; G02B 1/041; G02B 2207/109;
(Continued)

(56) References Cited

U.S. PATENT DOCUMENTS 4,861,561 A    8/1989 Pritchard
4,878,748 A    9/1989 Johansen et al.
(Continued)

FOREIGN PATENT DOCUMENTS

CN         103524037       1/2014
IL         40403           4/1976
(Continued)

OTHER PUBLICATIONS

Daruich de Souza et al. "Review of the Methodologies Used in the Synthesis Gold Nanoparticles by Chemical Reduction", Journal of Alloys and Compounds, 798: 714-740, Available Online May 28, 2019.
(Continued)

*Primary Examiner* — Jie Lei

(57) ABSTRACT

A method of diffusing one or more of gold nanoparticles, silver nanoparticles, gold ions, and silver ions, into a solid transparent material, causing it to absorb at least some wavelengths of visible light, UV light, or both, the method comprising:
(a) providing a first volume of organic solvent with one or more of gold nanoparticles, silver nanoparticles, gold ions and silver ions, blocked with one or more ligands, suspended in the organic solvent;
(b) adding a quantity of the volume of organic solvent to a volume of water;
(c) immersing the transparent material in the volume of water; and
(d) heating the volume of water with the added organic solvent and the transparent material for a period of
(Continued)

time, causing the one or more of gold nanoparticles, silver nanoparticles, gold ions and silver ions to diffuse into the transparent material.

14 Claims, 20 Drawing Sheets

(51) Int. Cl.
| | |
|---|---|
| *B22F 1/065* | (2022.01) |
| *B22F 9/24* | (2006.01) |
| *C03C 17/00* | (2006.01) |
| *C08J 7/06* | (2006.01) |
| *B82Y 20/00* | (2011.01) |
| *B82Y 40/00* | (2011.01) |
| *G02B 1/04* | (2006.01) |
| *G02C 7/02* | (2006.01) |

(52) U.S. Cl.
CPC .............. *C08J 7/065* (2013.01); *G02B 5/206* (2013.01); *G02B 5/208* (2013.01); *B22F 2301/255* (2013.01); *B22F 2304/054* (2013.01); *B82Y 20/00* (2013.01); *B82Y 40/00* (2013.01); *C03C 2217/479* (2013.01); *C03C 2217/74* (2013.01); *C03C 2218/111* (2013.01); *G02B 1/041* (2013.01); *G02C 7/02* (2013.01)

(58) Field of Classification Search
CPC .......... B22F 1/0547; B22F 1/065; B22F 9/24; B22F 2301/255; B22F 2304/054; C23C 17/00; C23C 17/007; C23C 21/005; C23C 21/002; C23C 14/004; C23C 2214/04; C23C 2214/08; C23C 2214/32; C23C 2217/452; C23C 2217/479; C23C 2217/74; C23C 2218/111; C08J 7/06; C08J 7/065; C08J 2300/22; B82Y 20/00; B82Y 40/00; G02C 7/02
USPC ............ 351/159.63, 159.74, 159.8; 427/512, 427/515, 518, 523, 537, 546; 977/833, 977/834, 868, 954, 955
See application file for complete search history.

(56) References Cited

U.S. PATENT DOCUMENTS

| | | | |
|---|---|---|---|
| 5,617,154 | A | 4/1997 | Hoffman |
| 7,078,071 | B2 | 7/2006 | Taketomi et al. |
| 8,345,364 | B2 | 1/2013 | Liberman et al. |
| 8,736,992 | B2 | 5/2014 | Ofir et al. |
| 8,833,937 | B2 | 9/2014 | Shehadeh et al. |
| 9,927,635 | B2 | 3/2018 | Ishak et al. |
| 2001/0029752 | A1 | 10/2001 | Natan et al. |
| 2006/0021468 | A1 | 2/2006 | Ah |
| 2007/0139792 | A1 | 6/2007 | Sayag |
| 2012/0040175 | A1 | 2/2012 | Hurst et al. |
| 2014/0124715 | A1 | 5/2014 | Ofir et al. |
| 2015/0225287 | A1* | 8/2015 | Amin .................... A01N 59/16 |
| | | | 65/30.14 |
| 2016/0090446 | A1 | 3/2016 | Sun et al. |
| 2018/0079953 | A1 | 3/2018 | Shin |
| 2019/0106354 | A1* | 4/2019 | Martin .................. C03C 21/005 |
| 2020/0131435 | A1 | 4/2020 | Pousthomis |
| 2020/0363659 | A1 | 11/2020 | Ambler |

FOREIGN PATENT DOCUMENTS

| | | |
|---|---|---|
| TW | 201133620 | 10/2011 |
| WO | WO 2006/135390 | 12/2006 |
| WO | WO 2008/028217 | 3/2008 |
| WO | WO 2010/106370 | 9/2010 |
| WO | WO 2013/084176 | 6/2013 |
| WO | WO 2014/124348 | 8/2014 |
| WO | WO 2019/166472 | 9/2019 |
| WO | WO 2019/215630 | 11/2019 |
| WO | WO 2019/215630 A9 | 11/2019 |
| WO | WO 2016/033425 | 6/2021 |
| WO | WO 2023/073685 | 5/2023 |

OTHER PUBLICATIONS

International Preliminary Report on Patentability Dated Nov. 19, 2020 From the International Bureau of WIPO Re. Application No. PCT/IB2019/053773. (10 Pages).
International Search Report and the Written Opinion Dated Nov. 13, 2019 From the International Searching Authority Re. Application No. PCT/IB2019/053773. (14 Pages).
Invitation to Pay Additional Fees Dated Aug. 21, 2019 From the International Searching Authority Re. Application No. PCT/IB2019/053773. (2 Pages).
Ahmad et al. "Effect of Reaction Time on Green Synthesis of Gold Nanoparticles by Using Aqueous Extract of Elaise Guineensis (Oil Palm Leaves)", 4th International Conference on Process Engineering and Advanced Materials, ICPEAM 2016, Kuala Lumpu, Malaysia, Aug. 15-17, 2016, Procedia Engineering 148: 467-472, Aug. 15, 2016.
Brust et al. "Synthesis of Thiol-Derivatised Gold Nanoparticles in A Two-Phase Liquid-Liquid System", Journal of the Chemical Society, Chemical Communications, 1994(7): 801-802, 1994.
Epifani et al. "Sol-Gel Synthesis and Characterization of Ag and Au Nanoparticles in SiO2, TiO2, and ZrO2 Thin Films", Journal of the American Ceramic Society, 83(10): 2385-2393, Dec. 20, 2004.
Fu et al. "Shape-Controlled Synthesis of Highly Monodisperse and Small Size Gold Nanoparticles", Science in China Series B: Chemsitry, 50(4): 494-500, Aug. 2007.
Li et al. "Z-Scan Study on A Silver Nanoparticles Embedded TeO2—SiO2 Glass Prepared by Sol-Gel Method", Key Engineering Materials, 768: 239-245, Published Online Apr. 25, 2018.
Llordes et al. "Tunable Near-Infrared and Visible-Light Transmittance in Nanocrystal-in-Glass Composites", Nature, 500(7462): 323-326, Aug. 15, 2013.
Murayama et al. "Deposition of Gold Nanoparticles on Niobium Pentoxide With Different Crystal Structures for Room-Temperature Carbon Monoxide Oxidation", ChemCatChem Communications, 8(16): 2620-2624, Published Online Jul. 14, 2016.
Polte "Fundamental Growth Principles of Colloid Metal Nanoparticles—A New Perspective", CrystEngComm, 17(36): 6809-6830, Jun. 23, 2015.
Preller et al. "Non-Aqueous Sol-Gel Synthesis of FePt Nanoparticles in the Absence of In Situ Stabilizers", Nanomaterials, 8(5): 297-1-297-16, Published Online May 3, 2018.
Said et al.
Supplementary European Search Report and the European Search Opinion Dated Apr. 14, 2022 From the European Patent Office Re. Application No. 19799581.4. (16 Pages).
International Search Report and the Written Opinion Dated Mar. 22, 2023 From the International Searching Authority Re. Application No. PCT/IL2022/051080 (1 Page).
Notice of Allowance Dated Jan. 24, 2024 From the US Patent and Trademark Office Re. U.S. Appl. No. 18/284,305. (11 Pages).
Supplementary Partial European Search Report and the Provisional Opinion Dated Dec. 7, 2021 From the European Patent Office Re. Application No. 19799581.4. (15 Pages).
Invitation to Pay Additional Fees Dated Jan. 9, 2023 From International Searching Authority Re. Application No. PCT/IL2022/051080. (3 Pages).
Andrawus et al. "Light Modulates Ocular Complications in An Albino Rat Model of Type 1 Diabetes Mellitus", Translational Visual Science & Technology, 6(4): 1-1-1-13, Jul. 3, 2017.
Gu et al. "Preparation and Antibacterial Properties of Gold Nanoparticles: A Review", Environmental Chemistry Letters, 19(1): 167-187, Published Online Aug. 12, 2020.
Hajipour et al. "Antibacterial Properties of Nanoparticles", Trends in Biotechnology, 30(10): 499-511, Published Online Aug. 9, 2012.

(56) References Cited

OTHER PUBLICATIONS

Yaghoubi et al. "Self Cleaning TiO2 Coating on Polycarbonate: Surface Treatment, Photocatalytic and Nanomechanical Properties", Surface & Coatings Technology, 204(9-10): 1562-1568, Available Online Oct. 8, 2009.
Communication Pursuant to Article 94(3) EPC Dated Mar. 26, 2024 From the European Patent Office Re. Application No. 19799581.4 (3 Pages).
International Preliminary Report on Patentability Dated May 10, 2024 From the International Bureau of WIPO Re. Application No. PCT/IL2022/051080 (16 Pages).
Notice of Allowance Dated Aug. 19, 2024 from the US Patent and Trademark Office Re. U.S. Appl. No. 18/674,963. (12 Pages).

\* cited by examiner

| Coating layer containing nanoparticles (220) |
|---|
| Transparent base layer (210) |

PRODUCTS USING GOLD AND SILVER NANOPARTICLES AND IONS TO ABSORB VISIBLE AND UV LIGHT

RELATED APPLICATIONS

This application is a National Phase of PCT Patent Application No. PCT/IB2019/053773 having International filing date of May 8, 2019, which claims the benefit of priority under 35 USC § 119(e) of U.S. Provisional Patent Application No. 62/668,278 filed on May 8, 2018. The contents of the above applications are all incorporated by reference as if fully set forth herein in their entirety.

FIELD AND BACKGROUND OF THE INVENTION

The present invention, in some embodiments thereof, relates to methods of manufacturing nanoparticles (e.g. from gold and/or silver) and to the resultant nanoparticles as well as to products including them.

U.S. Pat. No. 8,736,992 to Ofir et al. describes an optical power-limiting passive device and a method for limiting optical power transmission in lenses and windows using absorption changes in a photochromic composition. The matrix in the photochromic compositions is described as being a mineral glass or sol-gel in some embodiments.

US Patent Application Publication No. 2001/0029752 describes methods for the preparation of metal nanoparticle and glass composites as well as the glass composites themselves. In particular, a method for the preparation of colloidal metal nanoparticles imbedded in a glass surface is described. Further disclosed is a method for making an array of zeptoliter vials by preparing a composite of colloidal metal nanoparticles imbedded in a glass surface, and dissolving the colloidal metal nanoparticles.

Chinese Patent Application Publication No. CN 103524037 describes a silver nanoparticle composite block bismuthate glass material. According to the application, the bismuthate glass is used as matrix glass, and the composition is optimized by adding TiO2 and doping with the silver-containing compound. The prepared silver nanoparticle composite block bismuthate glass material has relatively wide infrared transmission range, relatively high mechanical strength, good chemical stability and relatively high linear refractive index. It is suggested the material is useful for all-optical switches and related nonlinear optical devices.

Taiwanese Patent Application Publication No. TW2011/33620 describes a composite dielectric material doped with nanoparticles of rare earth metal oxide embedded in silicon dioxide showing colossal dielectric response and magneto-dielectric effect and a manufacturing method therefore. According to the specification, the composite dielectric material is doped with nano-crystalline rare metal oxide which is embedded in silicon dioxide glass matrix synthesized by the manufacturing method using sol-gel route.

Preller et al, "Non-Aqueous Sol-Gel Synthesis of FePt Nanoparticles in the Absence of In Situ Stabilizers," *Nanomaterials* 8, 297 (2018), downloaded from doi:10.3390/nano8050297 on May 1, 2019, describes the synthesis of FePt nanoparticles in a non-aqueous sol-gel. Other papers in the same special issue of *Nanomaterials* describe the sol-gel synthesis of various metal oxide nanoparticles.

Brust et al, "Synthesis of thiol-derivatised Gold Nanoparticles in a Two-phase Liquid-Liquid System," *J. Chem. Soc., Chem. Commun.* (1994) 801-802, describes using two-phase (water-toluene) reduction of $AuCl_4^-$ by sodium borohydride in the presence of an alkanethiol to prepare solutions of 1-3 nm gold particles bearing a surface coating of thiol.

Joerg Polte, "Fundamental Growth Principles of Colloidal Metal Nanoparticles—a New Perspective," *Cryst. Eng. Comm.* 17 (June 2015), describes models of nucleation and growth of metal nanoparticles, including the LaMer model.

Additional background art includes, but is not limited to, U.S. Pat. No. 8,345,364 and US Patent Application Publication Nos. 2014/0124715 and 2001/0029752.

SUMMARY OF THE INVENTION

An aspect of some embodiments of the invention concerns coating a transparent material with gold and/or silver nanoparticles in a sol-gel, or diffusing gold and/or silver nanoparticles and/or ions into a transparent material, with one or more types of ligands bound to the nanoparticles and ions, to absorb UV and visible light over a broad range of wavelengths.

In some Exemplary embodiments of the Invention there is provided a method of manufacture including: (a) preparing a solution phase of a sol-gel comprising an organic complex of ions of a group 11 transition metal dissolved in an organic solvent; and (b) stirring the solution phase of the sol-gel together with a liquid comprising a reducing agent until the growth of nanoparticles formed from the ions of the group 11 transition metal reduced by the reducing agent substantially ceases while controlling one or more reaction parameters to produce a sol-gel having nanoparticles of a group 11 transition metal having a monodispersity ≤20% embedded therein. A method according to claim 1, comprising coating a solid surface with said sol-gel having said nanoparticles embedded therein. Optionally, coating a solid surface comprises coating a surface of a solid transparent material. Optionally, reducing the ions comprises stirring the solution phase of the sol-gel with a liquid comprising a reducing agent for a reaction time. Optionally, the reaction time lasts until the growth of nanoparticles formed from said ions of the group 11 transition metal reduced by the reducing agent substantially ceases. Optionally, said reducing agent comprises at least one member selected from the group consisting of $NaBH_4$, $KBH_4$, KBr and ascorbic acid. In some embodiments the method includes maintaining the temperature below 10° C. during the stirring. Alternatively or additionally, in some embodiments the Group 11 transition metal includes gold. Alternatively or additionally, in some embodiments the organic complex of ions of the group 11 transition metal includes chloroauric acid ($H[AuCl_4]$). Alternatively or additionally, in some embodiments the Group 11 transition metal includes silver. Alternatively or additionally, in some embodiments the organic complex of ions of the group 11 transition metal includes silver nitrate $Ag(NO_3)$. Alternatively or additionally, in some embodiments the sol-gel includes tin-doped indium oxide nano-crystals (ITO NCs) embedded in niobium oxide glass (NbOx). Alternatively or additionally, in some embodiments the preparing includes mixing ITO NCs with NbOx and the organic complex of ions of a group 11 transition metal. Alternatively or additionally, in some embodiments the preparing includes mixing ITO NCs with NbOx followed by addition of the organic complex of ions of a group 11 transition metal. Alternatively or additionally, in some embodiments the reducing agent includes at least one member selected from the group consisting of NaBH4, KBH4, KBr and ascorbic acid. Alternatively or additionally, in some embodiments the method includes stabilizing the organic complex of ions of a group 11 transition metal with at least one reagent selected from the group consisting of thiols and amines. Alternatively or additionally, in some embodiments the method includes coating a surface with the sol-gel having the nanoparticles embedded therein. Optionally, the at least one ligand agent comprises at least two ligand agents, including at least one thiol ligand agent and one amine ligand agent.

In some exemplary embodiments of the invention there is provided a composition including: glass; and nanoparticles of a group 11 transition metal having a monodispersity ≤20% embedded in the glass. In some exemplary embodiments of the invention, the nanoparticles have a monodispersity ≤10%. Alternatively or additionally, in some embodiments the nanoparticles have a monodispersity ≤5%.

Alternatively or additionally, in some embodiments the nanoparticles comprise gold. Alternatively or additionally, in some embodiments the nanoparticles comprise silver.

In some exemplary embodiments of the invention there is provided an article of manufacture including: (a) a base layer of a transparent material; and (b) a coating layer comprising gold or silver nanoparticles. In some exemplary embodiments of the invention, at least some of the nanoparticles have an average size of 1 nm to 5 nm.

Alternatively or additionally, in some embodiments at least some of the nanoparticles have an average size of 6 nm to 10 nm. Alternatively or additionally, in some embodiments at least some of the nanoparticles have an average size of 10 nm to 50 nm. Alternatively or additionally, in some embodiments wherein the nanoparticles have a monodispersity ≤7.5%. Alternatively or additionally, in some embodiments the coating layer is applied to one side of the base layer. Alternatively or additionally, in some embodiments the coating layer is applied to both sides of the base layer.

In some exemplary embodiments of the invention there is provided method including: (a) dissolving $HAuCl_4$ in water to produce free $AuCl^-_4$ ions; (b) transferring the $AuCl^-_4$ ions to toluene in the presence of Tetraoctylammonium bromide (TOAB); (c) blocking with thiol and/or amine; and (d) reducing to form nanoparticles.

There is further provided, in an exemplary embodiment of the invention, a method of producing gold or silver nanoparticles comprising:
(a) providing an aqueous solution of ions comprising gold, ions comprising silver, or both;
(b) transferring the ions from the aqueous solution to an organic solvent using a transfer agent;
(c) blocking the ions with at least two different ligand agents, other than the transfer agent, each comprising a different type of ligand; and
(d) reducing the blocked ions to form the nanoparticles.

Optionally, providing the aqueous solution comprises dissolving $HAuCl_4$ in water to form $AuCl_4^-$ ions, dissolving $AgNO_3$ in water to form $Ag^+$ ions, or both.

Optionally, the transfer agent comprises a tetra-alkyl ammonium salt, a bromide salt, or a tetra-alkyl ammonium bromide salt.

Additionally, the transfer agent comprises one or both of tetraoctylammonium bromide (TOAB), and cetyltrimethylammonium bromide (CTAB).

Optionally, the two different ligand agents comprise an amine ligand agent and a thiol ligand agent.

Optionally, the method also comprises selecting a ratio of concentrations of amine to thiol ligand agents to produce nanoparticles with a light absorption profile with specified characteristics.

Optionally, the method also comprises selecting a length, branching ratio, or both, of at least one of the ligand agents, to produce nanoparticles with a light absorption profile with specified characteristics.

In an embodiment of the invention, reducing the blocked ions comprises:
(a) adding a solution comprising one or more reducing agents selected from the group consisting of $NaBH_4$, $KBH_4$, KBr, ascorbic acid, hydrazine, and ethylene glycol, to the organic solvent with the blocked ions;
(b) stirring together the solution with the reducing agents, and the organic solvent with the ions, for a reaction time; and
(c) separating the organic solvent with the formed nanoparticles from the solution with the reducing agents, after the reaction time.

Optionally, finishing adding the solution to the organic solvent, and beginning the stirring, are done within 10 seconds after beginning adding the solution to the organic solvent.

Optionally, the method also comprises selecting concentrations of the ions, the reducing agents and the different ligand agents, a temperature during the stirring, and the reaction time, such that substantially all of the nanoparticles start to form within 10 seconds after adding the solution to the organic solvent, and the formed nanoparticles are substantially spherical with a standard deviation in diameter less than 20% of their mean diameter.

Optionally, the method also comprises selecting a temperature at which the stirring is done, and a reaction time, such that the formed nanoparticles are substantially fully crystallized.

There is further provided, according to an exemplary embodiment of the invention, a composition comprising gold or silver nanoparticles coated with at least two different types of ligands.

Optionally, the ligands include at least one amine ligand and at least one thiol ligand.

There is further provided, according an exemplary embodiment of the invention, a product comprising nanoparticles according to an embodiment of the invention, substantially spherical and with a standard deviation in diameter of less than 20%.

Optionally, the nanoparticles are substantially fully crystallized.

There is further provided, according to an exemplary embodiment of the invention, a method of processing a solid transparent material so that it absorbs UV light according to an absorption profile, the method comprising:
(a) providing an aqueous solution of ions comprising gold, ions comprising silver, or both;
(b) transferring the ions from the aqueous solution to an organic solvent using a transfer agent;
(c) blocking the ions with at least one ligand agent;
(d) adding a quantity of the organic solvent with the blocked ions to a volume of water;
(e) immersing the transparent material in the volume of water; and
(f) heating the volume of water with the added blocked ions and the transparent material for a period of time, causing the blocked ions to diffuse into the transparent material.

Optionally, the method also comprises selecting the one or more ligand agents, and selecting a ratio of concentration of ligand agents if there is more than one, so that the absorption profile has specified characteristics.

Optionally, the ions comprise both gold ions and silver ions.

Optionally, the method also comprises adding gold or silver nanoparticles, or both, to the volume of water that the ions are added to, before heating it with the transparent material immersed in it, causing the nanoparticles to diffuse into the transparent material together with the ions; or adding the nanoparticles to a volume of water and heating it with the immersed transparent material immersed in it over a different period of time, causing the nanoparticles to diffuse into the transparent material.

In an embodiment of the invention, the method is a method to process the transparent material so that it absorbs visible light as well as UV, and the method also comprises, after blocking the ions and before adding the organic solvent with the ions to the volume of water:
  (a) adding a solution comprising one or more reducing agents to the organic solvent with the blocked ions;
  (b) stirring together the solution with the reducing agents, and the organic solvent with the ions, for a reaction time long enough to reduce some but not all of the ions to nanoparticles; and
  (c) separating the organic solvent with the formed nanoparticles and the remaining ions from the solution with the reducing agents, after the reaction time;
wherein adding the quantity of organic solvent to the volume of water adds a quantity of the nanoparticles to the water, and heating the water also causes the nanoparticles to diffuse into the transparent material.

Optionally, the method also comprises rapidly stirring the aqueous solution with the ions in it, at more than 300 rpm for more than 10 minutes, to reduce agglomeration of the ions.

There is further provided, in an exemplary embodiment of the invention, a product comprising a transparent material with gold ions or silver ions or both, embedded in it, and with ligands attached to the ions which cause the material to absorb UV light.

Optionally, the ions absorb at least 10% of the light passing through the product in at least one direction, for at least one wavelength between 400 and 550 nm.

Optionally, the ions comprise both gold and silver ions.

Optionally, the ligands comprise amine ligands, thiol ligands, or both.

Optionally, the product also comprises gold nanoparticles, silver nanoparticles or both, embedded in the transparent material, which cause the material to also absorb visible light.

There is further provided, in an exemplary embodiment of the invention, a method of diffusing one or more of gold nanoparticles, silver nanoparticles, gold ions, and silver ions, into a solid transparent material, causing it to absorb at least some wavelengths of visible light, UV light, or both, the method comprising:
  (a) providing a first volume of organic solvent with one or more of gold nanoparticles, silver nanoparticles, gold ions and silver ions, blocked with one or more ligands, suspended in the organic solvent;
  (b) adding a quantity of the volume of organic solvent to a volume of water;
  (c) immersing the transparent material in the volume of water; and
  (d) heating the volume of water with the added organic solvent and the transparent material for a period of time, causing the one or more of gold nanoparticles, silver nanoparticles, gold ions and silver ions to diffuse into the transparent material.

Optionally, the method also comprises, after providing the first volume of organic solvent and performing (b), (c) and (d) with it a first time;
  (e) providing a second volume of organic solvent with one or more of gold nanoparticles, silver nanoparticles, gold ions and silver ions, blocked with one or more ligands, suspended in the organic solvent; and
  (f) performing (b), (c) and (d) a second time, with the second volume of organic solvent.

Optionally, one of the volumes of organic solvent has gold nanoparticles but substantially no silver nanoparticles suspended in it, and the other one of the volumes of organic solvent has silver nanoparticles but substantially no gold nanoparticles suspended in it, thereby reducing an incidence of gold nanoparticles touching silver nanoparticles when they are embedded in the transparent material, and reducing an effect of charge transfer between gold nanoparticles and silver nanoparticles that are touching each other when they are embedded in the transparent material and are exposed to light of a wavelength that would be absorbed by both the gold and silver nanoparticles.

There is further provided, according to an exemplary embodiment of the invention, a product comprising a transparent material with one or both of gold nanoparticles and silver nanoparticles, blocked with one or more ligands, embedded in the transparent material, absorbing visible light at one or more wavelengths.

Optionally, the transparent material has both gold and silver nanoparticles embedded in it, and most of the gold nanoparticles are not close enough to silver nanoparticles, and most of the silver nanoparticles are not close enough to gold nanoparticles, for charge transfer to occur between them when they absorb a same wavelength of light.

Optionally, the product absorbs at least 15% of the light that passes through it in at least one direction, for at least one wavelength between 400 and 550 nm, due to absorption by the nanoparticles.

There is further provided, according to an exemplary embodiment of the invention, a method of producing gold nanoparticles, silver nanoparticles, or a mixture of both, with an absorption profile for visible light with specified characteristics, the method comprising:
  (a) providing an aqueous solution of ions comprising gold, ions comprising silver, or both;
  (b) transferring the ions from the aqueous solution to an organic solvent using a transfer agent;
  (c) blocking the ions with at least one ligand agent;
  (d) adding a solution comprising one or more reducing agents to the organic solvent with the blocked ions;
  (e) selecting a reaction time to produce the absorption profile with the specified characteristics;
  (f) stirring together the solution with the reducing agents, and the organic solvent with the ions, for the reaction time; and
  (g) separating the organic solvent with the formed nanoparticles from the solution with the reducing agents, after the reaction time.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings and images. With specific reference now to the drawings and images in detail, it is stressed that the particulars shown are by way of example and for purposes of illustrative discussion of embodiments of the invention. In this regard, the description taken with the drawings and images makes apparent to those skilled in the art how embodiments of the invention may be practiced.

In the drawings:

FIG. 2 is a schematic depiction of an article of manufacture according to some exemplary embodiments of the invention;

FIG. 8b is a plot of an absorption profile due to the ions, using the transmission data shown in FIG. 8a;

DESCRIPTION OF SPECIFIC EMBODIMENTS OF THE INVENTION

Figure 1A:
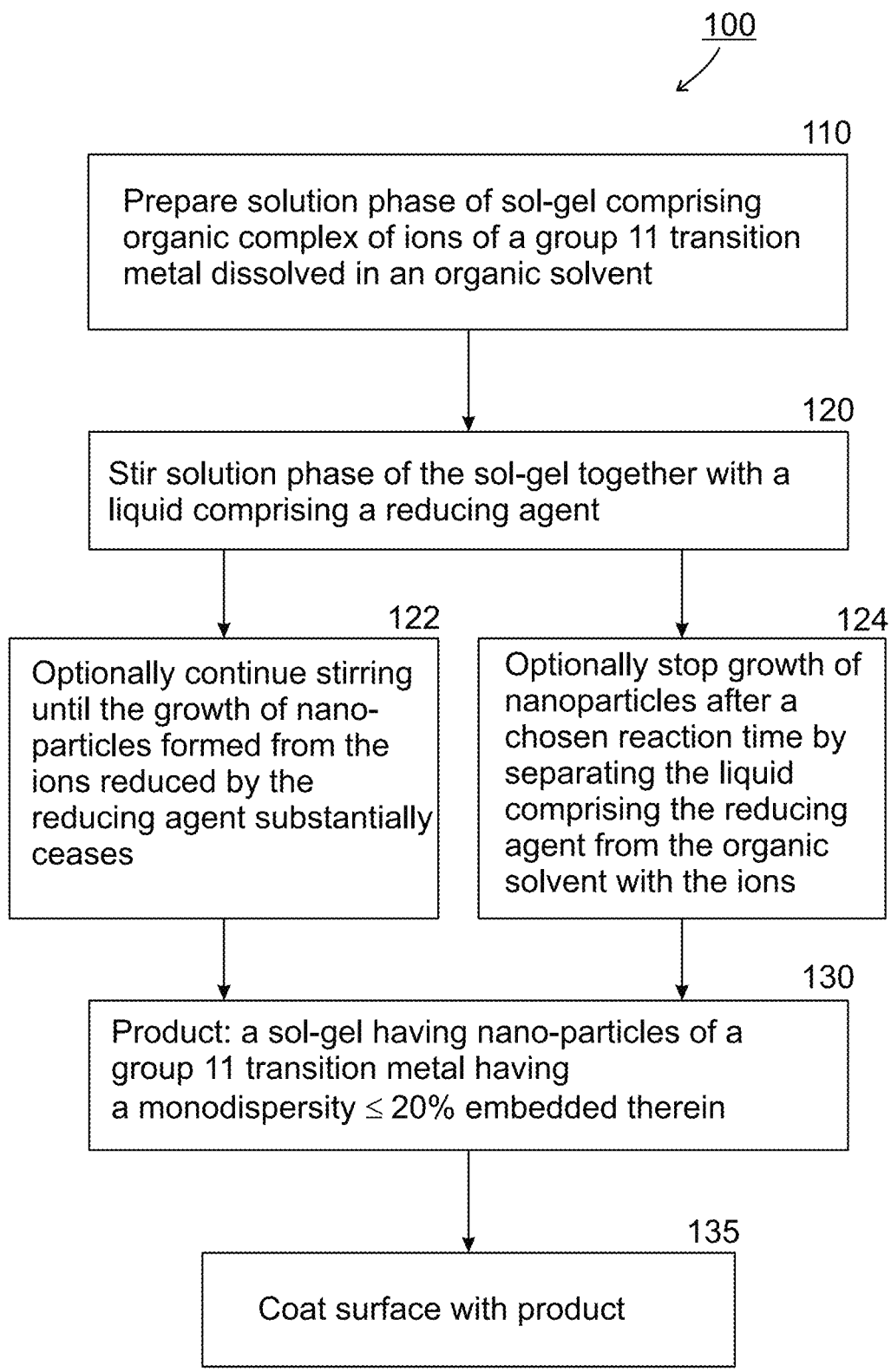
FIG. 1a is a simplified flow diagram of a manufacturing process according to some embodiments of the invention.

The present invention, in some embodiments thereof, relates to methods of manufacturing nanoparticles (e.g. from gold and/or silver) and to the resultant nanoparticles as well as to products including them and, more particularly, but not exclusively, to nanoparticles characterized by a monodispersity of less than 20%.

One aspect of some embodiments of the invention relates to a method for manufacturing a sol gel with nanoparticles of a controlled monodispersity embedded therein. According to various exemplary embodiments of the invention the nanoparticles comprise gold and/or silver. According to various exemplary embodiments of the invention the nanoparticles have an average diameter of 1 nm, 5 nm, 10 nm, 20 nm, 30 nm, 40 nm, 30 nm, 40 nm, 50 nm, 100 nm or intermediate or greater sizes. Alternatively or additionally, according to various exemplary embodiments of the invention the nanoparticles have a monodispersity ≤30%; ≤20%; ≤15%; ≤10%; ≤7.5%; ≤5%; ≤2.5%; ≤1% or intermediate or lower values.

Alternatively or additionally, according to various exemplary embodiments of the invention the nanoparticles have a monodispersity ≥20%; ≥15%; ≥10%; ≥7.5%; ≥5%; ≥2.5%; ≥1% or intermediate or higher values. For example, various embodiments of the invention the nanoparticles have a monodispersity of 1% to 10%; 2% to 8%; 4 to 6%; 5% to 15%; 7% to 12%; 9 to 11%; 15% to 25%; 17% to 22%; 19 to 21%; 20% to 30%; 22% to 28% or 24 to 26%.

An aspect of some embodiments of the invention relates to suspensions of nanoparticles in glass resulting from the method(s) described above.

An aspect of some embodiments of the invention relates to use of suspensions of nanoparticles in glass resulting from the method(s) described above as a coating on an optically transparent material. Resultant articles of manufacture include, but are not limited to, windows and lenses (e.g. for eyeglasses). Optionally, the coating is applied when it is soft, in the form of a sol-gel, and it then dries to form a hard glass with the nanoparticles suspended in it.

An aspect of some embodiments of the invention relates to blocking and reducing of $AuCl_4^-$ in an organic solvent (e.g. toluene) to produce nanoparticles.

An aspect of some embodiments of the invention relates to gold or silver nanoparticles coated with two different types of ligands, for example amine and thiol ligands, and to a method of producing them, by blocking gold or silver ions with ligand agents, and reducing them, for example by mixing them with a reducing agent, for a reaction time, to produce the nanoparticles. It should be noted that the "two different types of ligands" referred to here does not include the transfer agent that is used to transfer the ions from an aqueous solution to an organic solvent, even though the transfer agent may also have ligand-like properties, and have an effect on the absorption profile, but only includes ligand agents that are introduced after the ions have been transferred to an organic solvent. It also does not include the reducing agents, some of which may have ligand-like properties. Using two different types of ligands may result in nanoparticles that are more uniform in shape and size, and/or more spherical in shape, than if only a single type of ligand is used, because with two types of ligand agents the nanoparticles may start growing more quickly once the reducing agent has been added, for example within 10 seconds. Characteristics of the absorption profile of the nanoparticles, for example the shape of the profile or the peak wavelength, are optionally controlled by adjusting the ratio of amine to thiol ligands, and/or by adjusting the branching ratio and/or chain length of the ligands, and/or by adjusting the reaction time.

The ligand agents used for amine ligands are, for example, alkyl amine ligand agents, where an amine group substitutes for a methyl group in a hydrocarbon, and the ligand agents used for thiol ligands are, for example, alkyl thiol ligand agents, where a thiol (sulfur-hydrogen) group substitutes for a methyl group in a hydrocarbon.

An aspect of some embodiments of the invention relates to attaching ligands to gold and/or silver ions, so that they absorb UV in a range of wavelengths, and diffusing the ions into a solid transparent material, as well as to products, such as sunglasses, made from such a transparent material with UV-absorbing gold and/or silver ions embedded in them. Optionally, gold and/or silver nanoparticles are also diffused into the transparent material, so that visible light, for example blue light, is also absorbed.

An aspect of some embodiments of the invention relates to diffusing one or more of gold and silver nanoparticles and gold and silver ions, blocked with one or more ligands, into a solid transparent material, such as glass or plastic, so that the transparent material absorbs a range of wavelengths of UV and/or visible light, and to products made from such transparent material. The nanoparticles and/or ions are put in water, which is then heated with the transparent material immersed in it, for example using a commercial lens tinting machine, which causes the nanoparticles and/or ions to diffuse into the transparent material. This method provides an alternative to the method described above, in which nanoparticles are produced in a sol-gel, which is then coated onto transparent material, to produce a transparent material that absorbs light in a range of wavelengths. Optionally, if both gold and silver nanoparticles are diffused into the transparent material, they are not mixed together in the water, but one composition of nanoparticles is diffused into the transparent material before the other composition of nanoparticles, to reduce a tendency for charge transfer to occur between gold and silver nanoparticles that are adjacent to each other, which may adversely affect their absorption profile.

Products produced by the methods described herein, including products coated with a sol-gel containing nanoparticles, and products containing transparent material that nanoparticles and/or ions have been diffused into, can help to reduce harmful exposure to UV and short wavelength visible light, for example when used in sunglasses. Generally, gold and silver ions absorb light in the UV, between about 220 and 400 nm, and gold and silver nanoparticles absorb light in the visible range between about 400 and 530 nm. The harmful effects of UV are well known, and there is increasing evidence that light in the 400 to 530 nm range can also have harmful effects.

Before explaining at least one embodiment of the invention in detail, it is to be understood that the invention is not necessarily limited in its application to the details of implementation and the concentrations of the components and/or order of method steps set forth in the following description and/or illustrated in the drawings and/or the Examples. The invention is capable of other embodiments or of being practiced or carried out in various ways.

Exemplary Method

FIG. 1a is a simplified flow diagram of a method of manufacture indicated generally as 100. Depicted Exemplary Method 100 includes:

Preparing 110 a solution phase of a sol-gel comprising an organic complex of ions of a group 11 transition metal dissolved in an organic solvent and stirring 120 the solution phase of the sol-gel together with a liquid, for example an aqueous solution, comprising a reducing agent, while controlling one or more reaction parameters to produce a sol-gel having nanoparticles of a group 11 transition metal with a desired monodispersity and average diameter. Optionally the stirring continues 122 until the growth of nanoparticles formed from said ions of the group 11 transition metal reduced by the reducing agent substantially ceases. Alternatively, the growth of nanoparticles is stopped 124 after a specified reaction time, for example 1 minute, 5 minutes, 10 minutes, 30 minutes, 1 hour, or 3 hours, by stopping the stirring and allowing the aqueous solution comprising the reducing agent to separate from the water-immiscible organic solvent containing the nanoparticles and remaining ions, and discarding the solution comprising the reducing agent. According to various exemplary embodiments of the invention the sol-gel (glass) has nanoparticles of a group 11 transition metal with a monodispersity ≤20%, ≤15%, ≤10%, ≤7.5%, ≤5%, ≤2.5%, ≤2% or lesser or intermediate percentages embedded therein. According to various exemplary embodiments of the invention, the nanoparticles have an average diameter less than 1 nm, between 1 and 2 nm, between 2 and 5 nm, between 5 and 10 nm, between 10 and 20 nm, between 20 and 50 nm, or greater than 50 nm. For other parameters held constant, a longer reaction time generally results in nanoparticles with a larger average diameter. According to various exemplary embodiments of the invention the organic solvent is Toluene or another un-polar organic solvent with n≤7 (number of carbon atoms). Alternatively or additionally, in some embodiments solidification of the sol-gel contributes to cessation of particle growth. In some embodiments method 100 includes maintaining the temperature below 10° C. during stirring 120. In some embodiments the Group 11 transition metal comprises gold. In some embodiments the organic complex of ions of the group 11 transition metal comprises an organic complex of the tetrachloroaurate ion ($AuCl_4^-$). Alternatively or additionally, in some embodiments the Group 11 transition metal comprises silver. In some embodiments the organic complex of ions of the group 11 transition metal comprises an organic complex of the silver ion $Ag^+$. In some embodiments the sol-gel comprises tin-doped indium oxide nano-crystals (ITO NCs) embedded in niobium oxide glass (NbOx). Alternatively or additionally, the sol-gel comprises silica gel.

In some exemplary embodiments of the invention, preparing 110 comprises mixing ITO NCs with NbOx and the organic complex of ions of a group 11 transition metal.

In other exemplary embodiments of the invention, preparing 110 comprises mixing ITO NCs with NbOx followed by addition of the organic complex of ions of a group 11 transition metal.

Alternatively or additionally, in some embodiments the reducing agent comprises at least one member selected from the group consisting of $NaBH_4$, $KBH_4$, KBr and ascorbic acid. In some exemplary embodiments of the invention, $NaBH_4$ and $KBH_4$ are used interchangeably. In some embodiments use of ascorbic acid produces nano-wires or nano-rods. In some embodiments KBr serves as a reducing agent for $AgNO_3$.

In some embodiments method 100 includes stabilizing the organic complex of ions of a group 11 transition metal with at least one reagent selected from the group consisting of thiols and amines. Exemplary thiol and amine stabilizing agents are listed in Table 1.

Alternatively or additionally, in some embodiments method 100 includes coating 135 a surface with the sol-gel having nanoparticles embedded therein (product 130). For example, according to various exemplary embodiments of the invention windows and/or lenses of glasses are coated 135.

In some embodiments of the invention, the sol-gel is coated on the surface when it is still a liquid or has a soft gel consistency, and the coating then dries to form a hard glass with the nanoparticles embedded in it. For example, if the sol-gel comprises tin-doped indium oxide nanocrystals in niobium oxide glass, then it dries to form a tin-indium-niobium oxide glass. If the sol-gel comprises silica gel, then it dries to form a silicon dioxide glass.

Exemplary Gold Solution $2.53 \times 10^{-4}$ mol (0.1 gr) of $HAuCl_4 \cdot 3H_2O$ was dissolved in 8 mL of water for 1 min. The aqueous phase was executed using $8.96 \times 10^{-4}$ mol (0.49 gr) of TOABr in toluene (27 mL) for 10 min with stirring at 1200 rpm or more. Then, the phases were separated and the organic phase was kept under ice temperature, or at 4° C.

TABLE 1

Exemplary Thiol and Amine Stabilizing agents

| No. | Name | Acronym | MW (gr/mol) | d (gr/ml) |
|---|---|---|---|---|
| C > 10 | | | | |
| 1 | dodecanthiol | DDT | 202.4 | 0.844 |
| 2 | 11-mercapto-1-undecanol | MUD | 204.37 | S |
| 3 | decanethiol | DT | 174.35 | 0.847 |
| 4 | octadecanthiol | ODT | 286.57 | 0.847 |
| 5 | Tert-dodecanthiol | TDDT | 202.4 | 0.86 |
| 6 | 11-mercapto undecan acid | MUA | 218.36 | Solid |

TABLE 1-continued

Exemplary Thiol and Amine Stabilizing agents

| No. | Name | Acronym | MW (gr/mol) | d (gr/ml) |
|---|---|---|---|---|
| C < 10 | | | | |
| 1 | hexanethiol | HT | 118.24 | 0.84 |
| 2 | Butanethiol | BT | 90.19 | 0.84 |
| 3 | 2Ethylhexanethiol | EHT | 146.29 | 0.843 |
| Benz | | | | |
| 1 | 2-nitro-4-trifluoro-methyl-benzenethiol | NTFMBT | 223.18 | Solid |
| 2 | 2-Amino-4-chlorobenzenethiol | ACBT | 159.64 | Solid |
| 3 | benzylmercaptan | BM | 159.64 | Solid |
| 4 | 2-mercaptobenzyl alcohol | MBA | 124.21 | 1.05 |
| 5 | 2-mercapto-1-methylimidazole | MMI | 114.7 | Solid |
| dis | | | | |
| 1 | Dibutyl Disulfide | DBDS | 178.56 | 0.937 |
| 2 | Benzyl Disulfide | BDS | 246.39 | Solid |
| Amine | | | | |
| 1 | Oleylamine | OA | 267.5 | 0.813 |
| 2 | Octadecylamine | ODA | 269.52 | Solid |

Exemplary Stabilizing (Blocking) Reaction with Dodecylamine

To get 5 nm diameter gold nanoparticles, $2.33 \times 10^{-4}$ mol (0.043 gr) of dodecylamine (DA) was dissolved in 4 mL toluene for 5-8 min. Subsequently it was added to 13 mL of the Au solution (gold ions in the toluene phase). The solution was kept under ice temperature and stirred for 30 min. This reaction can be done inside or outside a glove box.

The color shifts from red to deep red-black immediately after adding DA, then fades gradually to light yellow. In the case where only an amine group is used, 0.048 gr is added to the Au solution, and then the Au is reduced as described below.

Exemplary Stabilizing (Blocking) Reaction with Thiols

In a glove box, $0.25 \times 10^{-4}$ mol of thiol molecule (T) was dissolved in 4 mL toluene for 4-5 min (see SI Table1). The molar ratio of thiol:Au is 0.1:1. Subsequently, add to 13 mL of the Au solution (in toluene phase). The solution was kept under ice temperature and stirred for 30 min. Combination of the above solutions (Solution T&DA) and stirring for 10 min.

Exemplary Reducing Reaction $3.3 \times 10^{-3}$ mol (0.127 gr) of $NaBH_4$ was dissolved in 8 mL water and cooled to 0° C. Then, added rapidly (8 mL in 2-3 sec) to the cool Au solution (which was kept under ice temperature). The reaction was allowed to occur while stirring at 1200 rpm or more at ice temperature for a reaction time of 3 hours.

Additional Exemplary Method

Figure 1B:
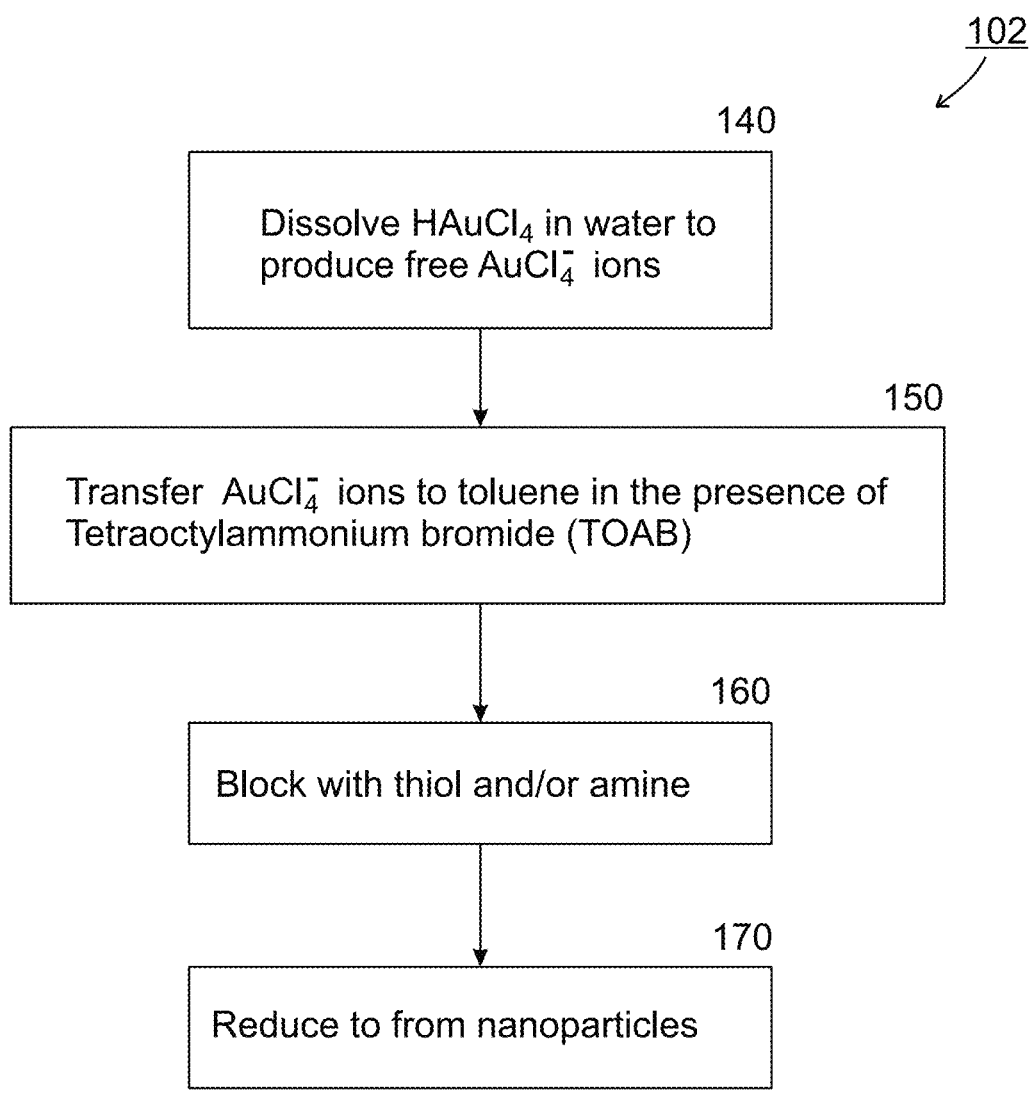
FIG. 1b is a simplified flow diagram of a manufacturing process according to additional embodiments of the invention.

FIG. 1b depicts an additional exemplary method of producing nanoparticles indicated generally as 102. Depicted exemplary method 102 includes dissolving 140 $HAuCl_4$ in water to produce free $AuCl_4^-$ ions and transferring 150 the $AuCl_4^-$ ions to toluene in the presence of Tetraoctylammonium bromide (TOABr) followed by blocking 160 with thiol and/or amine and reducing 170 to form nanoparticles.

The chemistry for method 102 is as follows:

dissolving Au in $H_2O$ (140)

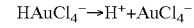

transferring the Au(III) to organic solution by TOAB (150)

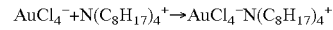

adding dodecylamine and thiol (R—SH) (160)
Dodecylamine:

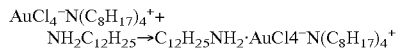

Thiol:

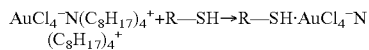

reducing after combination (170)

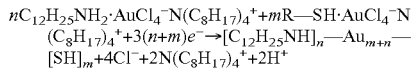

Method 102 is used to integrate gold nanoparticles into a sol-gel after synthesis by mixing with different volumes (1:1 to 1:20 Au:sol-gel) and concentrations (1-50 mM). Method 102 is also optionally used for producing nanoparticles that are going to be stored and used later for any other purpose.

In method 100 (making the Au inside the sol-gel), the reducing step is made in the presence of the sol-gel solution.

Exemplary Cleaning Procedure

After the nanoparticles have been synthesized by reducing the ions, in method 102, the phases are separated and the organic solvent phase with the nanoparticles, the denser phase, was removed from the bottom of the flask. The solvent is then removed by rotary evaporation at 100 rpm at room temperature and the nanoparticles are cleaned three times using 20 mL of cold ethanol (4° C.). After each cleaning, the gold nanoparticles precipitate at the bottom of the flask, and the ethanol is slowly removed. After all the cleanings, 50 mL of toluene is added to suspend the nanoparticles, and the solution is kept at 10° C.

Exemplary Compositions

Various exemplary embodiments of the invention are compositions resulting from methods described hereinabove. The exemplary compositions include a sol-gel and nanoparticles of a group 11 transition metal having a monodispersity ≤20%; ≤10%; ≤7.5%; ≤5% or ≤2.5% or lesser or intermediate percentages embedded in the sol-gel. In some embodiments the nanoparticles comprise gold. In some embodiments the nanoparticles comprise silver.

Exemplary Coated Product

FIG. 2 is a schematic representation of an article of manufacture indicated generally as 200. Depicted exemplary article 200 includes a base layer 210 of a transparent material, and a coating layer 220 comprising gold and/or silver nanoparticles. In some embodiments of the invention, coating layer 220 comprises the sol-gel made as described above, and coated onto base layer 210 when it is still a soft gel. Layer 220 then dries to form a hard glass, with the nanoparticles embedded in it.

According to various exemplary embodiments of the invention the size of the nanoparticles in layer 220 contributes to quenching of light passing through coating layer 220 at specific wavelengths.

In some exemplary embodiments of the invention, at least some of the nanoparticles in coating layer 220 have an average size of 1 nm to 5 nm. Nanoparticles of this size contribute to absorbance of light at wavelengths of ~500 nm.

In some exemplary embodiments of the invention, at least some of the nanoparticles in coating layer 220 have an average size of 6 nm to 10 nm. Nanoparticles of this size contribute to absorbance of light at wavelengths of 505 nm to 650 nm.

In some exemplary embodiments of the invention, at least some of the nanoparticles in coating layer 220 have an average size of 10 nm to 50 nm. Nanoparticles of this size contribute to absorbance of light at wavelengths of 650 nm to 800 nm.

In some embodiments the nanoparticles have a monodispersity ≤7.5%.

In some embodiments coating layer 220 is applied to one side of base layer 210 (as depicted).

In some embodiments coating layer 220 is applied to both sides of base layer 210 (not depicted).

According to various exemplary embodiments of the invention base layer 210 is configured as a window (e.g. in an automobile) or as a lens in glasses. Use of coating layer 220 in glasses permits reduction in the amount of incident light at undesired wavelengths passing through the lens (base layer 210) without significantly altering the transparent appearance of the lens.

Exemplary Reaction Parameters

Numerous reaction parameters contribute to particle size and/or monodispersity. The following are listed as examples.

In some embodiments the concentration of ions of a group 11 transition metal contributes to particle size with higher concentrations producing larger particles.

According to various exemplary embodiments of the invention the concentration of ions of the group 11 transition metal is 0.1 millimolar to 20 millimolar.

Alternatively or additionally, in some embodiments the temperature at which stirring 120 (FIG. 1a) is conducted contributes to particle characteristics. In some embodiments the temperature during stirring 120 (FIG. 1a) is in the range of 0° C. to 50° C.; 1° C. to 45° C.; 2° C. to 25° C.; 3° C. to 20° C.; 4° C. to 15° C. or 5° C. to 10° C.

Alternatively or additionally, in some embodiments the temperature at which stirring 120 (FIG. 1a) is conducted is >1° C.; >2° C.; >4° C.; >6° C.; >8° C.; >10° C.; >15° C.; >20° C.; >25° C. or >30° C. or intermediate or greater temperatures. Alternatively or additionally, in some embodiments the temperature at which stirring 120 (FIG. 1a) is conducted is <1° C.; <2° C.; <4° C.; <6° C.; <8° C.; <10° C.; <15° C.; <25° C.; <50° C. or <75° C. or intermediate or greater temperatures.

In some exemplary embodiments of the invention, temperature fluctuation (e.g. ±1° C.; ±2° C.; ±3° C.; ±4° C.; ±5° C.; ±7° C.; ±10° C.; ±15° C.; ±20° C.; ±25° C. or ±30° C. or intermediate or lesser numbers of degrees) within the range influences monodispersity. According to various exemplary embodiments of the invention the influence of temperature fluctuation on monodispersity is 1%; 2%, 3%, 4%, 5%, 6%, 7%, 8%, 9% or 10% or intermediate or lesser percentages. Alternatively or additionally, in some embodiments increasing the temperature within the range contributes to an increase in average particle size. In cases where the temperature exceeds 50° C., non-spherical shapes have been observed to result.

Alternatively or additionally, in some embodiments the duration of stirring 120 (FIG. 1a) contributes to particle characteristics. For example, times of 30 min or less often produce 1-5 nm particles, times of 30 min to 2 hours often produce uniform nanoparticles of 5 to 8 nm and times longer than 2 hours often produce particles in excess of 8 nm average diameter.

Alternatively or additionally, in some embodiments the molar ratio of reducing agent to ions of a group 11 transition metal contributes to small particle size. For example, a 5 to 10 fold; 6 to 9 fold or 7 to 8 fold molar excess of reducing agent contributes to rapid reduction of the ions which deters further growth of the particles. Greater than 10 fold molar excess produces nanoparticles of less than 20 nm, less than 15 nm, less than 10 nm, less than 2 nm or 1-2 nm. Less than 5 fold molar excess produces nanoparticles ≥30 nm: ≥40 nm or ≥50 nm average diameter or intermediate or greater average diameters.

Alternatively or additionally, in some embodiments the molar ratio of blocking/stabilizing agent to ions of a group 11 transition metal contributes to particle size. In some embodiments the stabilizing agent is provided in 1 to 10 fold molar excess. If the molar ratio of stabilizing agent to metal ions is less than 1, nanoparticles ≥50 nm result. If the molar ratio of stabilizing agent to metal ions is greater than 10 nanoparticles of 1 nm to 5 nm result.

Alternatively or additionally, in some embodiments of the invention the use of two different types of blocking/stabilizing agent, for example both amine and thiol ligand agents, and the ratio of amine to thiol ligand agents, contributes to uniformity in size and/or shape, and/or to a spherical shape, of the nanoparticles. Some examples of the monodispersity of gold nanoparticles obtained with the use of both amine and thiol ligand agents are given below in the "Examples" section.

Exemplary Stirring Equipment

Stirring 120 (FIG. 1a) was conducted using commercially available stirring equipment (HOT PLATE STIRRER 7"×7" C-MAG HS7 CERAMIC TOP 115V IKA catalog number 3581201 [IKA laboratory equipment; Staufen; Germany]). The stirring was done by a small Teflon coated magnet inside the solution at 1250 rpm. It is believed that similar equipment can be substituted.

Embedding Gold and/or Silver Ions in Transparent Material

Figure 3:
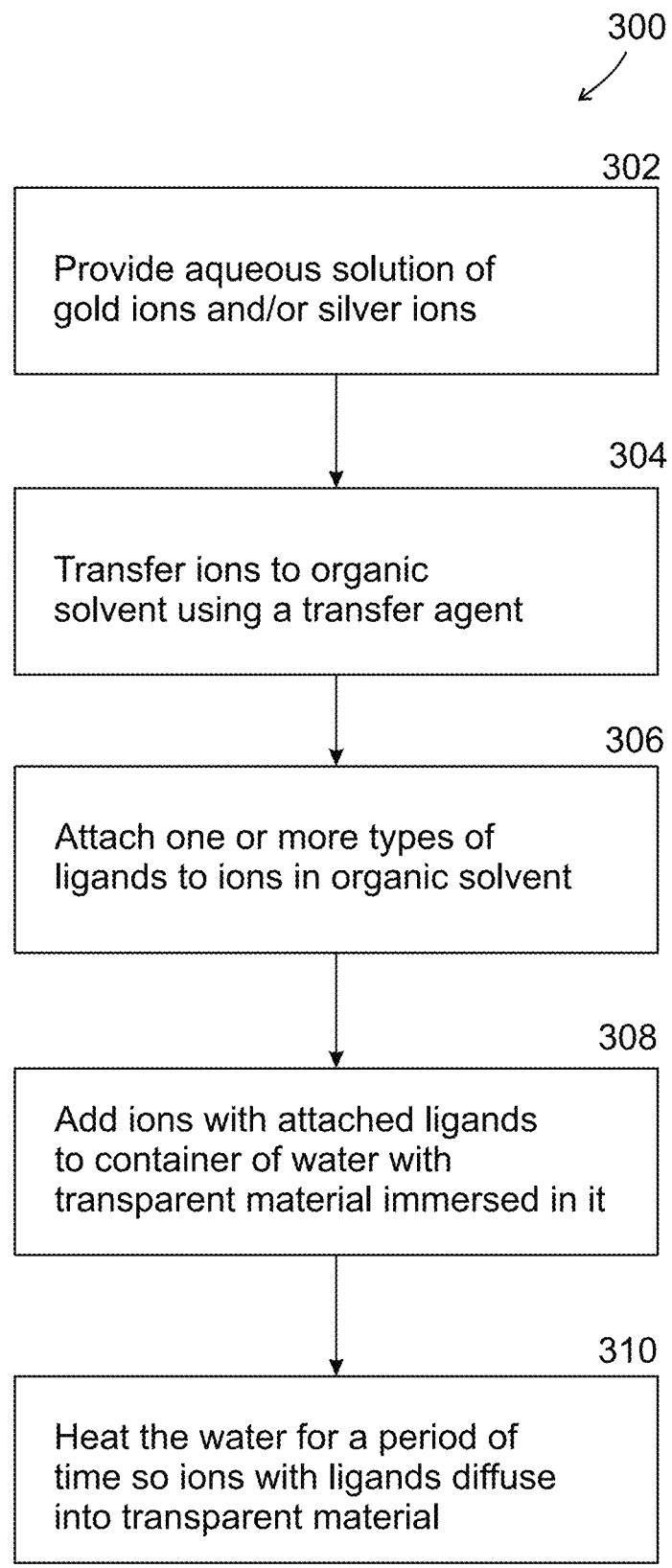
FIG. 3 is a simplified flow diagram illustrating a method of attaching gold or silver ions to one or more different kinds of ligands, and then diffusing the ions into a transparent material where they absorb some wavelengths of light, for example UV.

FIG. 3 shows a flowchart 300 illustrating an exemplary method for preparing ions of a group 11 transition metal, such as gold and/or silver ions, attaching one or more types of ligands to them, such as thiol and/or amine ligands, and embedding them in a solid material, for example a transparent material, such as glass or plastic. The ions with the attached ligands absorb light over a range of wavelengths in the UV, between 200 and 400 nm, while gold and silver nanoparticles generally absorb light in the visible, between 400 and 530 nm. When nanoparticles are also embedded in the transparent material, in addition to the ions, or when nanoparticles in sol-gel are coated on the transparent material as described above, the transparent material, used for example for sunglasses, can absorb a broad range of potentially harmful wavelengths in both the UV and in the blue range of the visible spectrum.

At 302, an aqueous solution of gold ions and/or silver ions is prepared. For example, a solution of gold ions is optionally prepared by dissolving $HAuCl_4$ or $HAuBr_4$ in water, while a solution of silver ions is optionally prepared by dissolving $AgNO_3$ in water. The volume and concentration of the solution is, for example, the volume and concentration described above under "Exemplary gold solution," which yields 8 mL of a 0.31 mM solution of $HAuCl_4$, and a similar volume and molar concentration of a $AgNO_3$ solution is optionally used for silver ions.

Optionally, before transferring the ions from the aqueous solution to an organic solvent, the aqueous solution with the ions is rapidly stirred for a period of time, to prevent the ions from agglomerating. This is done, for example, by stirring the aqueous solution at a rate between 300 and 600 rpm, or between 600 and 1200 rpm, or between 1200 and 1800 rpm, for less than 10 minutes, or between 10 and 20 minutes, or between 20 and 30 minutes, or between 30 and 60 minutes, or more than 60 minutes. The inventors have found that such stirring is especially useful for silver ions.

At 304, the ions are transferred to an organic solvent, for example a water-immiscible organic solvent, such as toluene, using a transfer agent, for example a tetra-alkyl ammonium salt or a bromide salt or both, such as tetraoctylammonium bromide (TOAB), or cetyltrimethylammonium bromide (CTAB). The aqueous solution of ions is mixed with the organic solvent and the transfer agent and stirred together, for example as described above under "Exemplary gold solution." Once the ions have been transferred to the organic solvent, the aqueous phase may be separated from the organic solvent and discarded.

At 306, one or more types of ligands are attached to the ions in the organic solvent. For example, 1 millimole of the ligand agents, amine and/or thiol, are mixed in 4 mL of the organic solvent, for example toluene. Then it is mixed with one millimole of the gold and/or silver ions. The inventors have found that good results are achieved when both thiol and amine ligand agents are used, in a molar ratio of 1:9. For example, dodecylamine (DA) is used as the amine agent, with 0.9 millimole in 4 mL of toluene, similar to what is described above, for gold ions, under "Exemplary stabilizing (blocking) reaction with dodecylamine," and 2-amino-4-chlorobenzenethiol (ACBT) is used as the thiol agent, with 0.1 millimole in 4 mL of toluene, similar to what is described above, for gold ions, under "Exemplary stabilizing (blocking) reaction with thiols." The 4 mL of toluene with DA, and the 4 mL of toluene with ACBT, are separately combined with 12 mL of toluene with half of the $2.53 \times 10^{-4}$ moles of the gold or silver ions, and each is stirred for 30 minutes under ice temperature. The two solutions, one with DA and gold or silver ions, and one with ACBT and gold or silver ions, are then combined and stirred for 10 minutes. The resulting solution has a molar ratio of Au:DA:ACBT of 1:0.9:0.1.

At 308, the solution of ions with the attached ligands are added to a container of water, for example 1 mL of the solution, with a 0.31 mM concentration of gold and/or silver ions, is added to 1 liter of water, with the transparent material immersed in it, for example glass, or a clear plastic such as polycarbonate, for example eyeglass lenses. Alternatively, 0.1 mL or 0.2 mL or 0.5 mL or 2 mL or 5 mL or 10 mL of the solution is added to 1 liter of water. Alternatively, the solution has a concentration of gold and/or silver ions of 0.03 mM, or 0.1 mM, or 1 mM, or 3 mM, or 10 mM, or a greater, lesser, or intermediate value. At 310, the water is heated, for example to 90° C. for 15 minutes, using a machine, such as a commercial lens tinting machine, that keeps the water at a constant temperature, for example CS tint unit 6507, sold by Aviva & Mann Optical Group, in Australia. This causes the ions to diffuse into the transparent material. Alternatively, the water is heated to 50, 60, 70, 75, 80, 85, 95 or 100 degrees, or a greater, lesser, or intermediate temperature, for 5 minutes or 10 minutes or 20 minutes or 30 minutes or 60 minutes. The transparent material is then removed from the water, and optionally washed in water and cleaned. The transparent material, with the ions embedded in it, will have an absorption profile that depends on the absorption profile of the ions, and on the concentration of ions in the material.

Embedding Gold and/or Silver Nanoparticles in Transparent Material

Figure 4A:
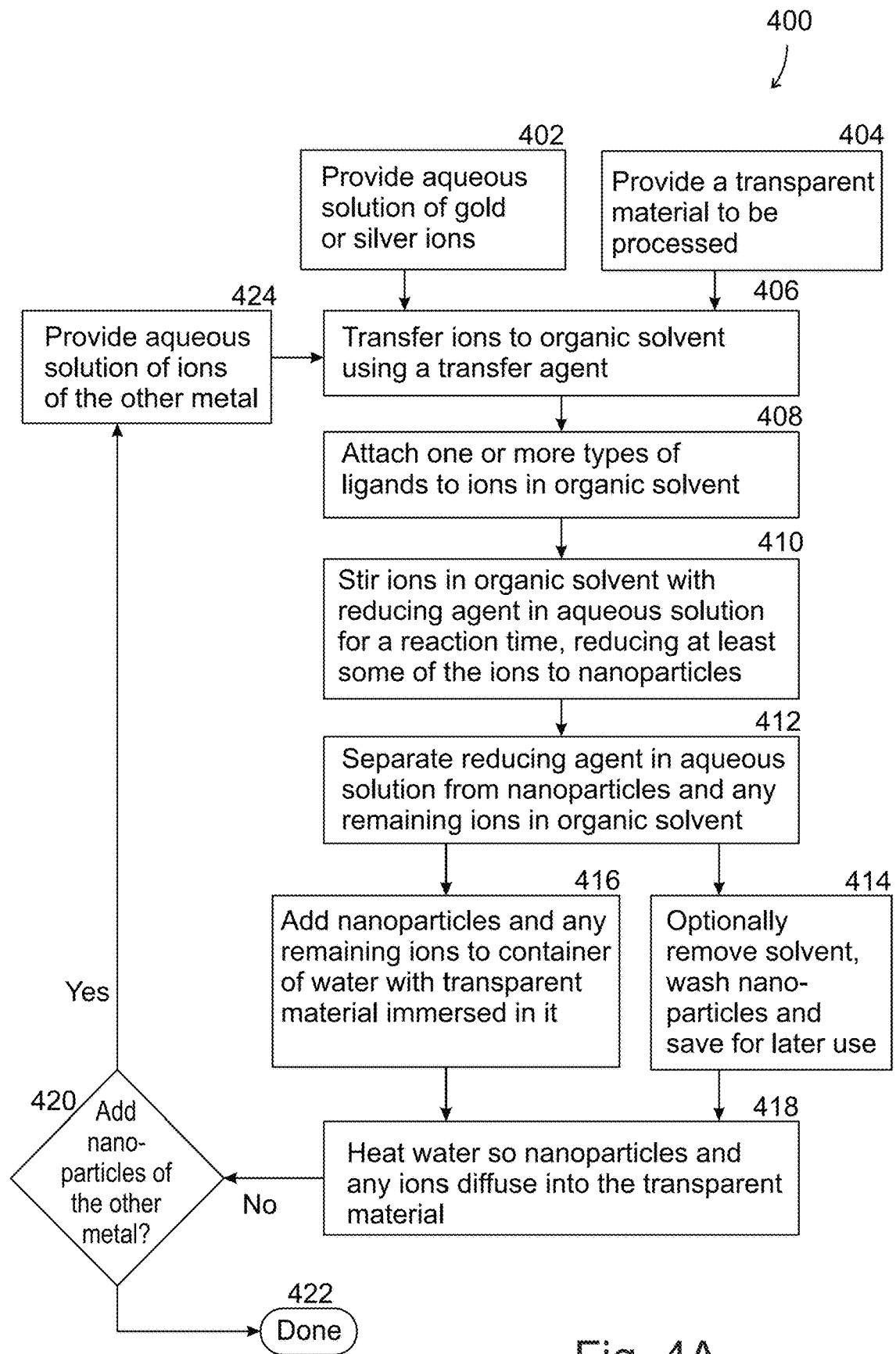
FIG. 4A is a simplified flow diagram.
Figure 4B:
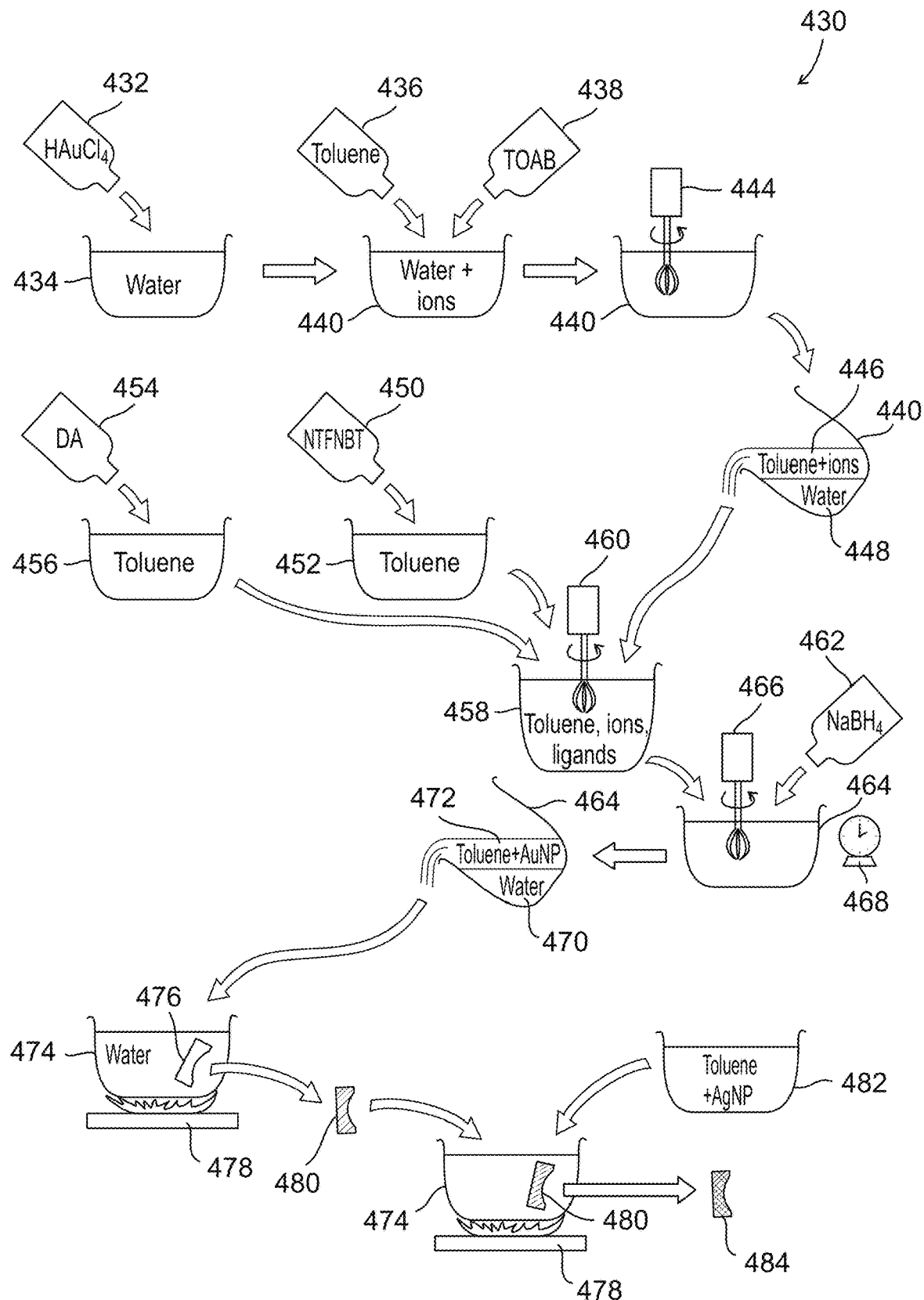
FIG. 4B is a schematic block diagram, illustrating a method of reducing some but not necessarily all gold or silver ions to nanoparticles, and diffusing the nanoparticles, possibly together with unreduced ions, into a transparent material, where they can absorb a broad range of wavelengths of light in the UV and the visible.

FIG. 4A shows a flowchart 400, and FIG. 4B shows a block diagram 430, for a method of embedding gold and/or silver nanoparticles in a transparent material, possibly together with gold and/or silver ions. This method is similar to the method of flowchart 300 in FIG. 3, but has some differences. Optionally, the ions and nanoparticles are prepared together, by reducing the ions, for example as described above in FIG. 1b, but stopping the reaction before all of the ions have been reduced to nanoparticles. Alternatively, the ions and nanoparticles are prepared separately, and are diffused into the same piece of transparent material at different times. Similarly, gold and silver ions, or gold and silver nanoparticles, are optionally not prepared together, but are prepared separately, and are diffused into the transparent material at different times. Particularly in the case of gold and silver nanoparticles, the inventors have found that it is potentially advantageous if they are prepared separately, and diffused into the transparent material one after the other, at different times. This is because, if gold and silver nanoparticles are prepared together, they may have a tendency to cluster together, with gold and silver nanoparticles adjacent to each other. That allows charge transfer to occur between the gold and silver nanoparticles, which may then act, in effect, like a single nanoparticle, with an absorption profile with a peak at a wavelength intermediate between the peak absorption wavelength of silver and gold nanoparticles. This will make the absorption profile narrower in wavelength than if the gold and silver nanoparticles were acting independently of each other. This effect can also occur with gold ions and silver ions. Alternatively, instead of diffusing the gold and silver nanoparticles into the plastic separately, it may be possible to prevent charge transfer between gold and silver nanoparticles by preparing the gold and silver nanoparticles separately, then mixing them together within less than 5 minutes, and diffusing the mixture into the transparent material.

Flowchart 400 and block diagram 430 describe the case where gold ions and nanoparticles are prepared together, and silver ions and nanoparticles are prepared together, but silver ions and nanoparticles are prepared separately from gold ions and nanoparticles, to avoid charge transfer between gold and silver nanoparticles.

At 402, an aqueous solution of gold ions or silver ions is provided, which may be done, for example, in any of the ways described for 302 in FIG. 3, for example, in the case of gold ions, dissolving chlorauric acid 432 in water 434 At 404, a piece of transparent material is provided, for example an eyeglass lens 476, for processing according to the method of flowchart 400.

At 406, the ions provided at 402 are transferred to an organic solvent 436, for example a water-immiscible organic solvent such as toluene, using a transfer agent 438, such as TOAB, for example as described by 304 in FIG. 3, in a container 440, using a stirrer 444. The organic solvent portion 446, including the ions, is separated from the aqueous portion 448, which is essentially clear water.

At 408, one or more types of ligands are attached to the ions, for example as described by 306 of FIG. 3. For example, a thiol ligand agent 450, such as NTFMBT, is dissolved in toluene 452, and an amine ligand agent 454, such as DA, is dissolved in toluene 456, and the two agents are combined with the organic solvent portion 446, with the ions, in a container 458, and stirred with a stirrer 460.

At 410, a liquid, for example an aqueous solution, comprising a reducing agent 462 is added to the organic solvent containing with the ions attached to ligands from container 458, in order to reduce the ions to nanoparticles, and the two solutions are vigorously stirred together in a container 464 using a stirrer 466, for example at 600 rpm or 1200 rpm, for a reaction time, measured for example by a timer 468. The reducing agent is, for example, any of $NaBH_4$, $KBH_4$, KBr, ascorbic acid, hydrazine, ethylene glycol, and aniline, or any combination of them. For example, $3.3 \times 10^{-3}$ mol (0.127 gr) of $NaBH_4$ is dissolved in 8 mL water and cooled to 0° C. Then, the solution of reducing agent is rapidly added (8 mL in 2-3 sec) to the solution of gold or silver ions, which is kept under ice temperature, and the two solutions are kept at ice temperature during the reaction time. A potential advantage of adding the reducing agent solution to the solution of ions rapidly, within a few seconds, is that the nanoparticles will all start to grow at nearly the same time, within a period of 10 seconds. This may result in nanoparticles of uniform size and uniform and spherical shape. The inventors have found that using both amine and thiol ligands, for example in a molar ratio of about 9:1, tends to make the nanoparticles all start growing at nearly the same time, within 10 seconds after adding the reducing agent solution to the ion solution, resulting in nanoparticles of relatively uniform size, and uniform and spherical shape, at least when $NaBH_4$ is used as a reducing agent. Certain other reducing agents, for example ascorbic acid, may tend to produce rod-shaped nanoparticles. Keeping the solutions at a constant temperature during the reaction time also tends to result in nanoparticles of uniform size and spherical shape. The reaction time is, for example, less than 1 minute, or between 1 minute and 2 minutes, or between 2 and 5 minutes, or between 5 and 10 minutes, or between 10 and 20 minutes, or between 20 and 30 minutes, or between 30 minutes and 1 hour, or between 1 and 2 hours, or between 2 and 3 hours, or more than 3 hours. For other reactions parameters kept the same, a longer reaction time generally results in nanoparticles of larger diameter.

At 412, the reaction is stopped by stopping the stirring, and letting the aqueous solution 470 with the reducing agent separate from the organic solvent 472 with the ions and nanoparticles. Alternatively, the reaction continues until substantially all of the ions have been reduced to nanoparticles. The aqueous solution 470 with the reducing agent is optionally discarded. If the reaction has not gone to completion, then the organic solvent will have a mixture of nanoparticles and ions.

At 414, for example in the case where there are substantially no ions remaining, only nanoparticles, the organic solvent is optionally removed from the nanoparticles, and the nanoparticles are washed and saved for later use. This is done, for example, as described above under "Exemplary cleaning procedure." The later use can include, for example, diffusing the nanoparticles into a transparent material, as described below, or incorporating the nanoparticles into a sol-gel.

Alternatively, at 416, the nanoparticles and any remaining ions in the organic solvent are added to a container of water 474 with transparent material 476 immersed in it for example as described for 308 in FIG. 3. At 418, the water is heated by a heater 478 so that the nanoparticles and any ions diffuse into the transparent material, for example as described for 310 in FIG. 3, but for nanoparticles instead of, or in addition to, ions. Transparent material 476 with the nanoparticles and any ions diffused into it, shown as treated transparent material 480, is removed from the water.

At 420, a decision is made as to whether nanoparticles of the other metal, for example silver in the case where gold ions were used at 402, should be added to the transparent material. If not, for example if both gold and silver nanoparticles have already been diffused into the transparent material, then the method ends at 422. If nanoparticles of the other metal are to be added to the transparent material, then at 424 an aqueous solution of ions of the other metal, either gold ions or silver ions, is provided, for example as described for 302 in FIG. 3. The ions are then transferred to an organic solvent using a transfer agent, at 406, and the method continues as described above, for the other metal, including adding nanoparticles and optionally ions of the other metal 482 to water in container 474, with treated transparent material 480 immersed in it, and heated on heater 478. Transparent material 480, now shown as further treated transparent material 484, is removed from the water. By diffusing gold nanoparticles and silver nanoparticles separately into the transparent material, it may be possible to avoid or at least greatly reduce having gold and silver nanoparticles cluster together, and to avoid or at least greatly reduce having charge transfer between gold and silver nanoparticles.

Optionally, the transparent material, or the transparent material used in the method of FIG. 3, is flexible, for example it is a flexible sheet of plastic, and, after the ions and/or nanoparticles are embedded in it, it is attached to a curved surface, for example a windshield of a car, where it filters out light of wavelengths that are absorbed by the embedded ions and/or nanoparticles.

It is expected that during the life of a patent maturing from this application many relevant reducing agents and stabilizing/blocking agents will be developed and the scope of the terms reducing agents and stabilizing/blocking agents is intended to include all such new technologies a priori.

The terms "absorbance" and "absorption" are sometimes used interchangeably herein.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Correlation Between Absorbance Profile and Reaction Time

In order to establish the relationship between reaction times (stirring 120 in FIG. 1*a* and absorbance profiles for nanoparticles prepared according to various embodiments of the invention a series of reactions were conducted in which time was the variable.

Figure 5A:
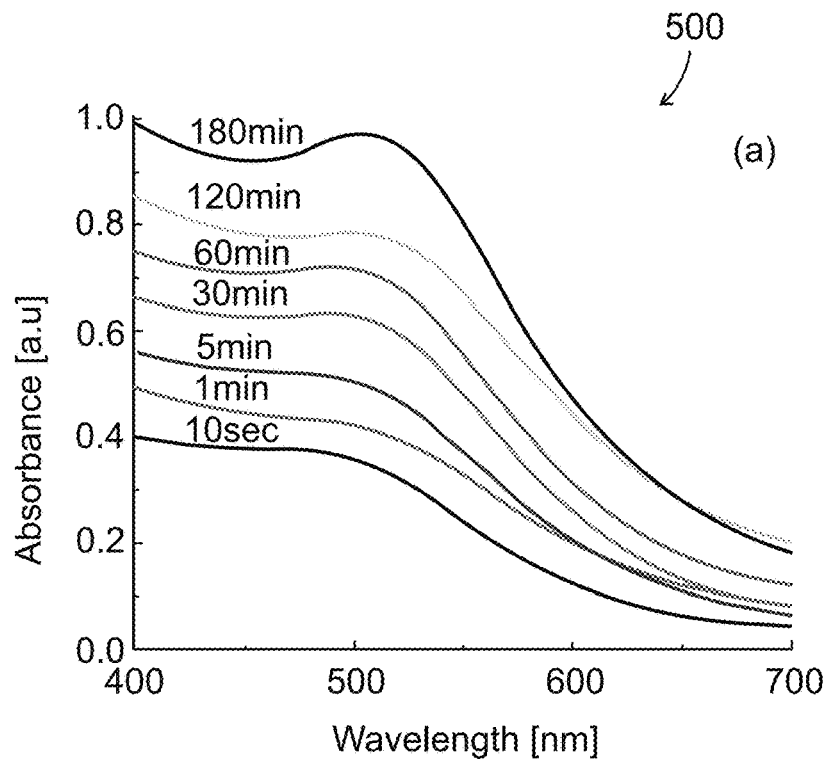
FIG. 5a is a plot of absorbance (a.u.) as a function of wavelength (nm) for amine blocked gold nanoparticle dispersions prepared during different reaction times (as indicated)

FIG. 5*a* 500) is a series of plots of Absorbance (a.u.) as a function of wavelength in nm for gold nanoparticles blocked with an amine reagent.

Figure 5B:
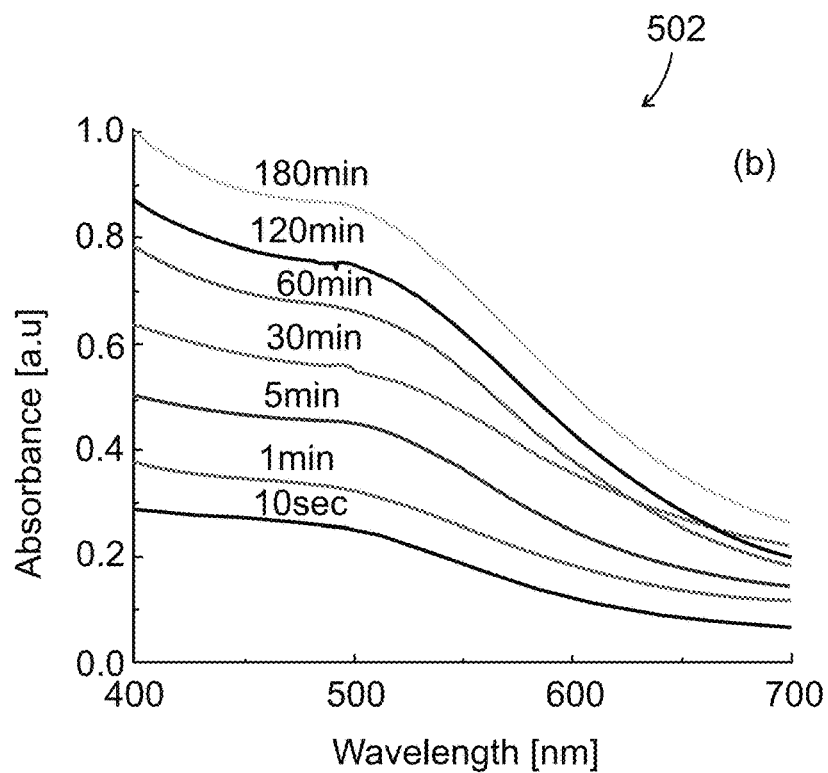
FIG. 5b is a plot of absorbance (a.u.) as a function of wavelength (nm) for bi-ligand blocked gold nanoparticle dispersions prepared during different reaction times (as indicated)

FIG. 5*b* (502) is a series of plots of Absorbance (a.u.) as a function of wavelength in nm for gold nanoparticles blocked with a bi-ligand reagent.

In FIGS. 5*a* and 5*b* reaction times are indicated next to each plot. For each plot a 1 μL sample of nanoparticles suspended in sol-gel was diluted with 1 mL of toluene and the absorbance profile was measured on the diluted sample.

The Absorbance profiles in this example demonstrate the homogeneity of the sample, because the peak in the absorbance is fairly narrow, only about 50 nm wide. However, it should be noted that there were some unreduced gold ions left in the solution, which have an absorbance peak in the UV, below 400 nm, and as a result the absorption peak of the nanoparticles appears as a shoulder on the absorbance peak of the ions, in FIGS. 5*a* and 5*b*, and this is also true in FIGS. 6*a* and 6*b*.

Example 2

Influence of Blocking Reagents on Absorbance Profile

In order to establish the influence of different blocking/stabilizing reagents on absorbance profiles for nanoparticles prepared according to various embodiments of the invention a series of reactions were conducted in which blocking/stabilizing reagent was the variable. Reaction time was 3 hours in each case.

Figure 6A:
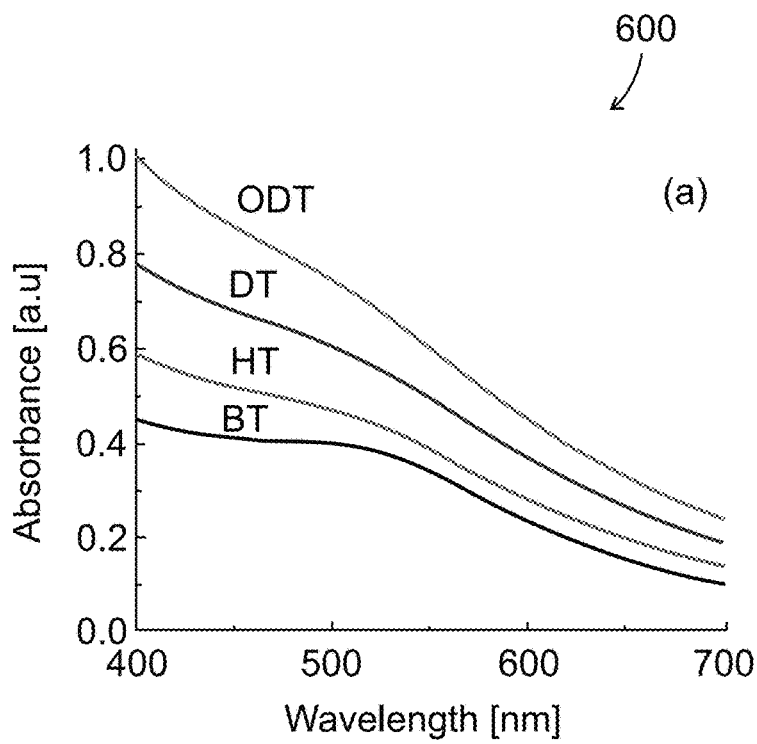
FIG. 6a is a plot of absorbance (a.u.) as a function of wavelength (nm) for thiol blocked gold nanoparticle dispersions prepared using different blocking reagents (ODT=octadecanthiol; DT=decanethiol; HT=hexanethiol and BT=Butanethiol)

FIG. 6a is a plot 600 of absorbance (a.u.) as a function of wavelength (nm) for thiol blocked gold nanoparticle dispersions prepared using different blocking reagents (ODT=octadecanthiol; DT=decanethiol; HT=hexanethiol and BT=Butanethiol).

Figure 6B:
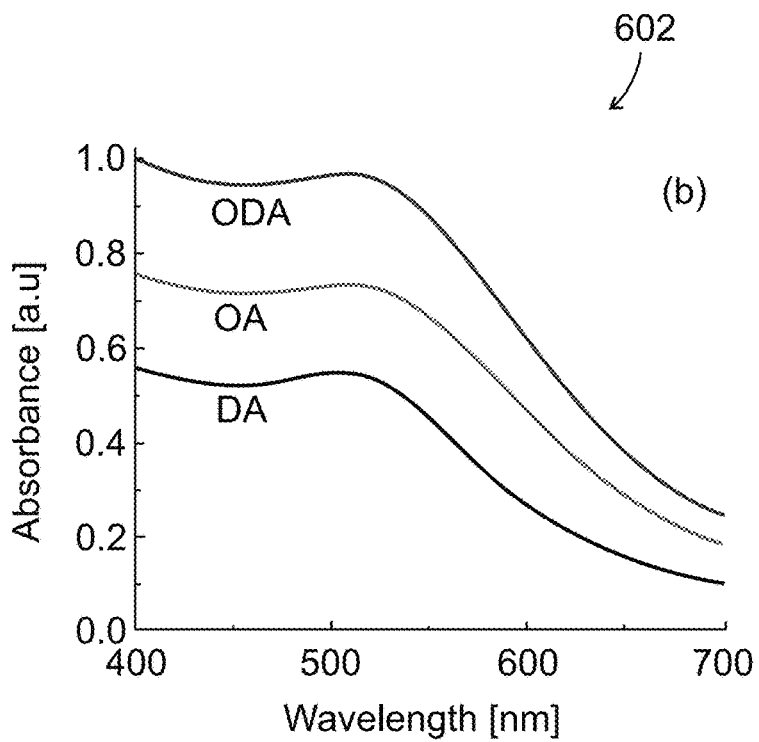
FIG. 6b is a plot of absorbance (a.u.) as a function of wavelength (nm) for amine blocked gold nanoparticle dispersions prepared during different blocking reagents (ODA=Octadecylamine; OA=Oleylamine; and DA=dodecylamine)

FIG. 6b is a plot 602 of absorbance (a.u.) as a function of wavelength (nm) for amine blocked gold nanoparticle dispersions prepared using different blocking reagents (ODA=Octadecylamine; OA=Oleylamine; and DA=dodecylamine).

In FIGS. 6a and 6b blocking reagents are indicated next to each plot. For each plot samples were diluted and measured as in Example 1.

The different blocking reagents on gold nanoparticles displayed characteristic optical signature typical of Au colloid: single surface plasmon resonance absorption is in the visible region with $\lambda_{max}$=489-520 nm. However, the shape and the position of the absorbance spectrum are dependent on the type of the bond, i.e. Au—N or Au—S, the ratio between the surface ligands, the length of the molecule and structure of the molecule (straight or branching). When the AuNPs are stabilized with ligands of amine such as DA, Oleylamine (OA) and Octadecylamine (ODA); which all form Au—N bonds, the absorbance spectrum looks shoulder-like regardless of the length or/and type of the molecule or the ratio between the Au and the amine ligand (FIG. 6b). However, as the chain length is longer, the nitrogen atom is weakly bonded to Au or/and a steric effect leads to less capping ligands attached to the surface and as a result a SP redshift is observed. The single surface plasmon resonance (SP) absorption was 514±2 nm, 512±2 nm and 506±2 nm for ODA, OA and DA respectively. Six methylene units shifts 8±4 nm the SP absorption to longer wavelengths.

Size effects in the absorption spectra were observed, with the SP shifting slightly to lower energies (redshift) and becoming narrower as particle size increased. The molar ratio between Au and ligand used in the synthesis also controls the final size of the AuNP. Differences in SP (shape or position) reflect differences in nanoparticle properties.

In the case of a bi-ligand with a straight thiol molecule, the longer the chain length the weaker the shoulder absorbance shape and the smaller the AuNP size. Similar phenomena were observed for mono thiol-capped Au nanocrystals which were found in good agreement with previous reports (Schadt et al. (2006) Chem. Mater. 18 (22): 5148). For example, FIG. 4a shows absorbance of Butanethiol (BT), Hexanethiol (HT), decanethiol (DT) and Octadecanthiol (ODT) which is C4, C6, C10 and C18 respectively. Although the molar ratio was constant in these samples (1:0.1:0.9 for Au:DA:T), the SP absorbance shifts to longer wavelengths (minor blueshift) with decreasing the chain length: 501±3 nm, 495±5 nm, 495±5 nm and 495±2 nm for BT, HT, DT and ODT respectively. This means, changing by 14 units of $CH_2$ shifts the SP spectrum only by 6±5 nm. This slightly dependence of the particle size or morphology of the thiol when first added to the as-prepared colloid is in agreement with previous reports (Prasad et al. (2002) Langmuir 18:7515-7520). However, refluxing leads to dramatic changes depending on the chain length. For example; annealing set at 149.0±1.5° C. for 1 hr., yield redshifts of 7.60±0.43 nm, 6.41±0.40 nm, and 5.86±0.31 nm in the peak absorption for C5, C10 and C15 respectively (Schadt et al. (2006) Chem. Mater. 18 (22): 5148).

This example indicates an ability to tune the optical window with high resolution.

We saw that thiols and amines can tune the optical window with ±50 nm resolution. Amines show a peaked absorbance shoulder while thiols show a smooth shoulder.

Ions of $Au^{+3}$ absorb near the UV 280-330 nm which eliminates the near for uv blocker.

Example 3

Exemplary Nanoparticles

In order to demonstrate the ability to control size and monodispersity bi-ligand gold nanoparticles blocked with DA and TFMBT were prepared. The molar ratio was 0.1:0.9:1 for DA:TFMBT:Au. Reaction time was three hours at ice temperature. Particle size measurement (in this and all subsequent examples) was performed using a Philips CM300 UltraTWIN equipped with a LaB6 filament and operated at 300 kV acceleration voltage. The size and size distribution were measured by nanoComposixprotocol: Mean nanoparticle size was calculated by measuring 100 individual nanoparticles as imaged by TEM. The coefficient of variation (CV) which indicates monodispersity was calculated by dividing the standard deviation of the nanoparticle size by the mean nanoparticle size, and multiplying by 100 to get a percentage. For instance, a 50 nm diameter nanosphere with a standard deviation of 3 nm would have a CV of 6% ({3/50}*100=6%). (nanoComposix, Inc.; San Diego CA; UA).

These nanoparticles correspond to the 180-minute plot in FIG. 5B (Example 1). Average particle size was 3.5 nm±1 nm (monodispersity 28%).

Example 4

Additional Exemplary Nanoparticles

In order to demonstrate the ability to control size and monodispersity, bi-ligand gold nanoparticles blocked with DA and TFMBT were prepared. The molar ratio was 0.1:0.9:1 for DA:TFMBT:Au. Reaction time was 90 minutes at 75° C.

Average particle size was 20 nm±4 nm (monodispersity 20%). This example demonstrates the insensitivity of the nanoparticle size to changes in temperature and reaction time, which may be referred to herein as the stability of the nanoparticles.

Example 5

Transmission Profiles of Plastic with Diffused Nanoparticles and Ions

Figure 7:
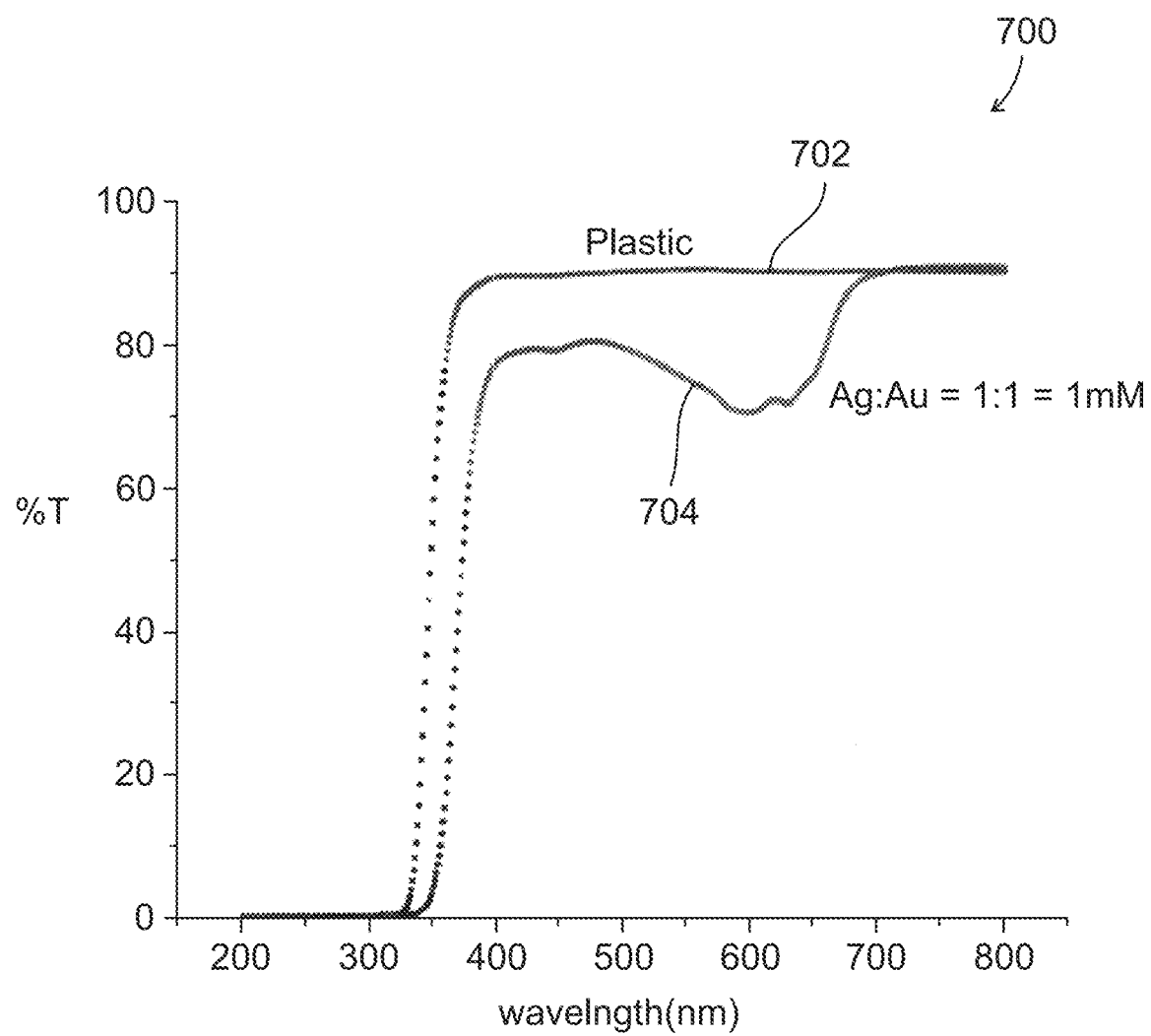
FIG. 7 is a schematic plot of a transmission profile for a piece of plastic without gold or silver nanoparticles or ions, and for the same piece of plastic with gold and silver ions and nanoparticles diffused into it.

FIG. 7 show a plot 700 of percent transmission (% T) as a function of wavelength, for a piece of transparent plastic which was heated in water with gold and silver nanoparticles and ions, according to the method described above for 308 or FIG. 3, at 90° C. for 30 minutes. The nanoparticles were made starting with a 1 mM solution of equal molar parts gold ions ($AuCl_4^-$ from $HAuCl_4$) and silver ions ($Ag^+$ from $AgNO_3$). Some but not all of the ions were reduced to form gold and silver nanoparticles, by stirring the ion solution rapidly with a reducing agent, as described above at 410 of FIG. 4A. The percent transmission % T is related to the absorption A by A=2−log(% T). The absorption A, in turn, is expected to be the sum of the absorption for each of the components (gold nanoparticles, silver nanoparticles, gold ions, and silver ions). The absorption for each component is the path length of light through the plastic, times the molar concentration of the component in the plastic, time the molar absorptivity of the component for that wavelength of light.

Curve 702 of FIG. 7 shows the transmission profile of the plastic, without any ions or nanoparticles diffused into it. Curve 704 shows the transmission profile for the plastic with the gold and silver ions and nanoparticles diffused into it. The transmission with the nanoparticles and ions present is reduced by 10% to 20%, compared to the plastic by itself, between 450 nm and 650 nm. This reduction in transmission is believed to be due mostly to the nanoparticles, with silver nanoparticles having absorption that is greatest at about 430 to 500 nm, and gold nanoparticles having absorption that is greatest at about 500 to 550 nm, though gold and silver ions may contribute as well, as will be discussed in the description of FIG. 8a, below.

The contribution of gold and silver ions to transmission curve 704 may be seen as well in the UV, before the transmission of the plastic cuts off at about 340 nm, as may be seen from curve 702. Curve 704 starts to cut off significantly at about 370 nm, and the absorption between 340 and 370 nm is believed to be due largely to the ions.

The reduction in transmission is expected to be significantly greater if a more concentrated ion solution were used, for example 5 mM instead of 1 mM.

This measurement of transmission was made with plastic prepared in two different ways: 1) with the gold and silver ions and nanoparticles combined in the same solution and diffused together into the plastic; and 2) first diffusing gold ions and nanoparticles into the plastic, and then diffusing silver ions and nanoparticles into the plastic. Very little difference was observed in the transmission profiles for the two cases, although the absorption was about 2% greater, between 400 and 600 nm, when the gold and silver ions and nanoparticles were diffused into the plastic separately.

Figure 8A:
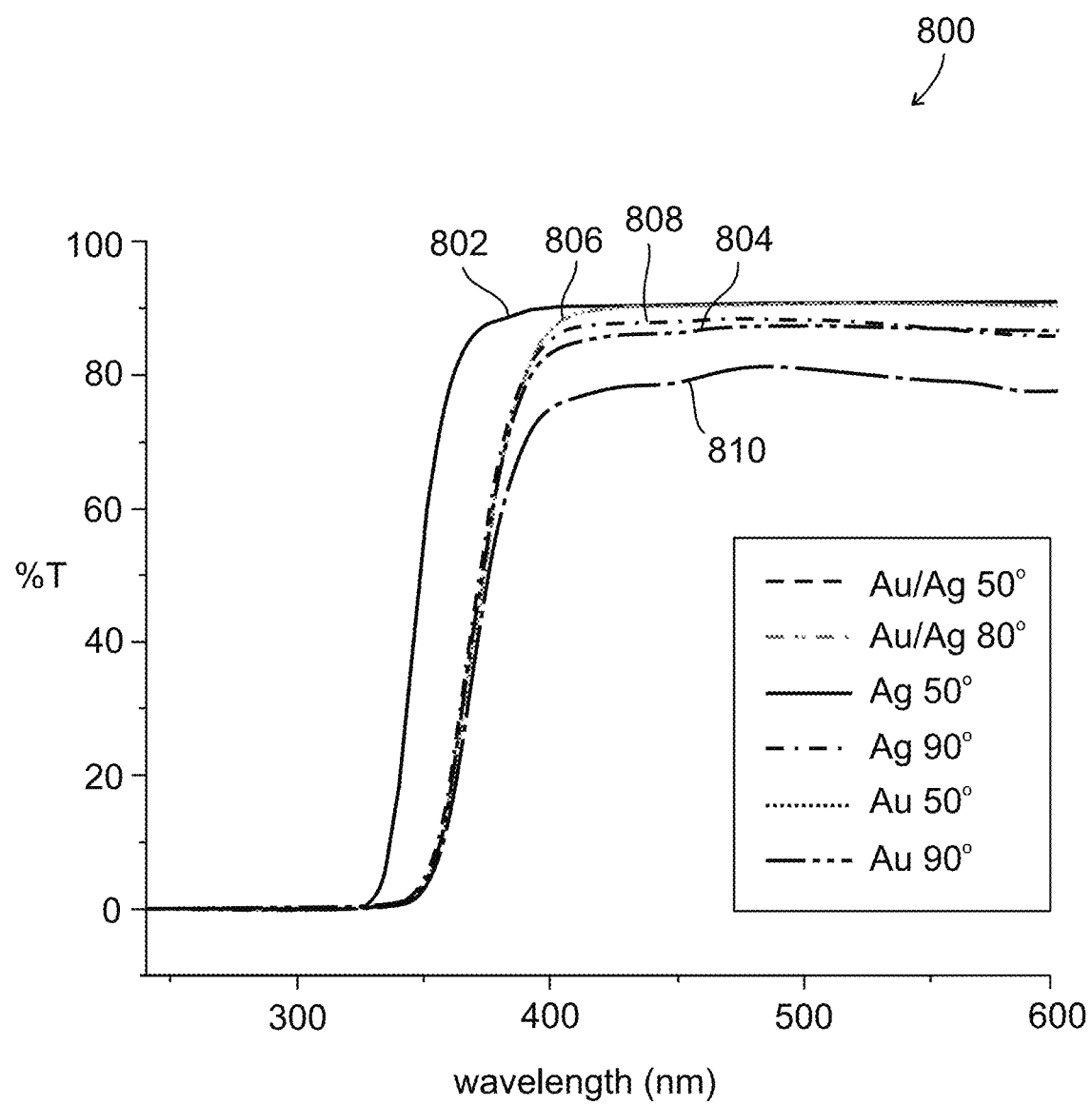
FIG. 8a is a schematic plot of transmission profiles for a piece of plastic with gold ions, silver ions, or both, diffused into it at different temperatures.

FIG. 8a shows a plot 800 the percent transmission as a function of wavelength, for a piece of plastic with only ions diffused into it, using the method described above in 308 of FIG. 3, for a diffusion time of 30 minutes. Profiles are shown for gold ions alone, for silver ions alone, and for a combination of gold and silver ions with a molar ratio of 1:1, at different water temperatures, 50° C., 80° C., and 90° C.

Curve 802 shows the transmission profile for silver ions alone, when the water temperature was 50° C. This transmission profile is almost identical to profile 702, the profile for the plastic without any ions or nanoparticles diffused into it. This suggests that there is very little diffusion of silver ions into the plastic when the temperature is only 50° C. Curve 804 shows the transmission profile for gold ions with the water at 50° C., and this shows a significantly lower transmission than curve 802, which indicates some gold ions do diffuse into the plastic at 50° C. Other transmission profiles shown in FIG. 8a are curve 806, for gold and silver ions together at 80° C., curve 808, for silver ions alone at 90° C., and curve 810, for gold ions alone at 90° C. The transmission profile was also measured for gold and silver ions together at 50° C., but this transmission profile is almost identical to curve 804 for gold ions alone, apparently because so few silver ions diffused into the plastic at 50° C.

Curves 804, 806, 808, and 810 all show a significant decrease in transmission at UV wavelengths, below about 390 nm, and extending down at least as far as 340 nm, where the plastic transmission has fallen almost to zero. This is similar to curve 704 in FIG. 7, and suggests that the absorption of UV seen in FIG. 7 is due mostly to the ions, both gold and silver.

Curve 806, the only curve in FIG. 8a showing the combined effects of gold and silver ions, shows much less decrease in transmission than curve 804, for gold alone at a lower temperature, or curve 808, for silver alone at a slightly higher temperature, above 400 nm. This may indicate that, at wavelengths above 400 nm, there is charge transfer between gold and silver ions which interferes with their absorption of photons. This does not seem to be as important an effect below 370 nm, where curve 806 dips below both curves 804 and 808.

The fact that curves 804, 808 and 810 have lower transmission than curve 802, at all wavelengths between 400 and 600 nm, shows that gold and silver ions also absorb light in that range, and the decrease in transmission in curve 704 in FIG. 7 is not due entirely to nanoparticles, but to ions as well. However, curve 704 has a lower transmission, especially between 500 and 600 nm, than any of the curves in FIG. 8a, and this is believed to be due to the nanoparticles.

Figure 8B:
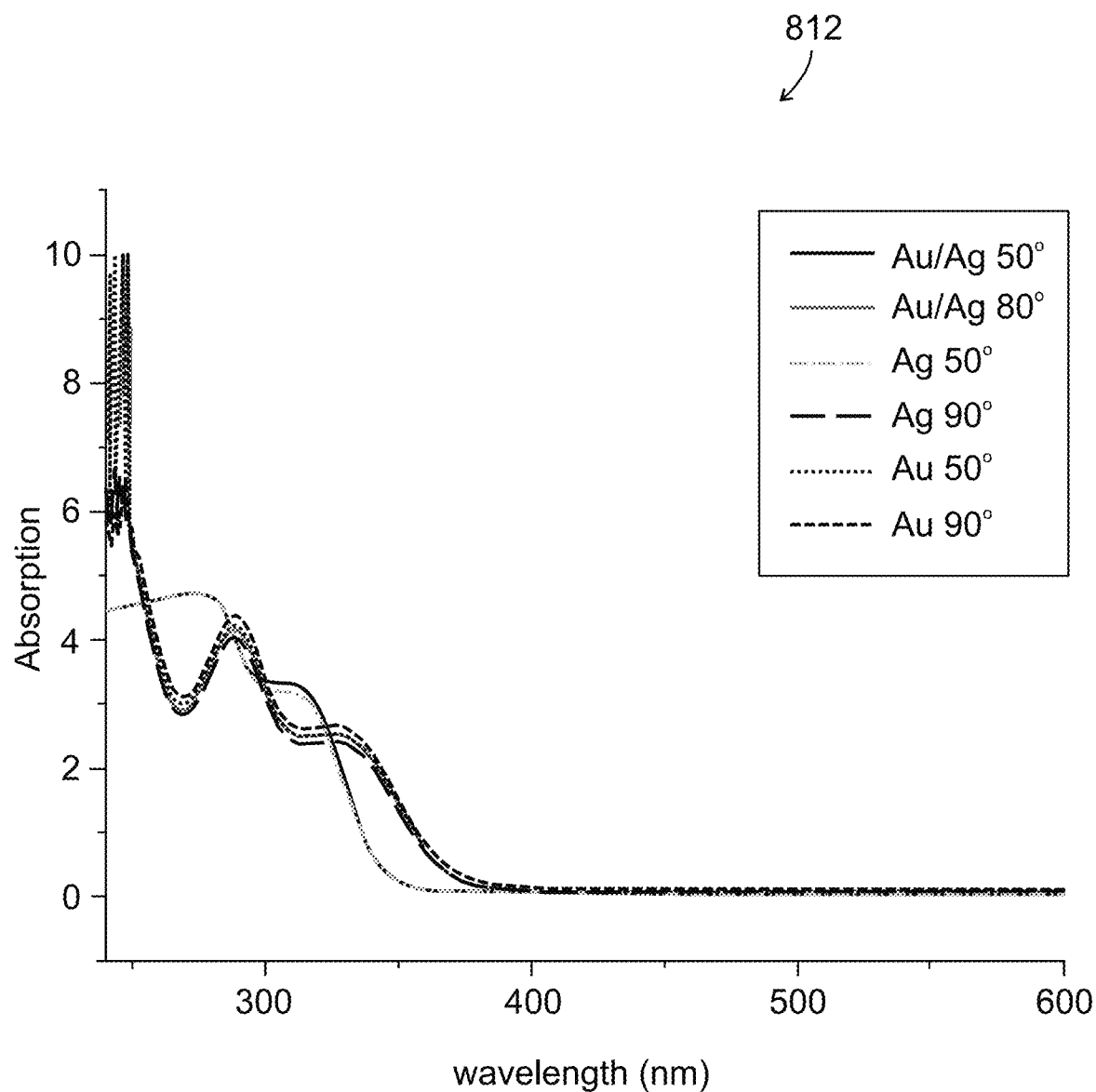

FIG. 8b shows a plot 812 of the absorption due only to the ions, not to the plastic, as a function of wavelength, using the same data as shown in FIG. 8a. FIG. 8b makes it possible to see differences in absorption for the range below 340 nm, where the transmission is virtually 0% in FIG. 8a. Note that the curve for gold ions at 90° C. is consistently about 10% higher in absorption, below 340 nm, than the curve for silver ions at 90° C., while the curve for combined gold and silver ions at 80° C. is in between those two curves. This indicates that gold ions have about a 10% higher absorptivity than silver ions, in this range of wavelengths, or possibly more gold ions than silver ions have diffused into the plastic under these conditions.

Example 6

Additional Exemplary Nanoparticles

Figure 9A:
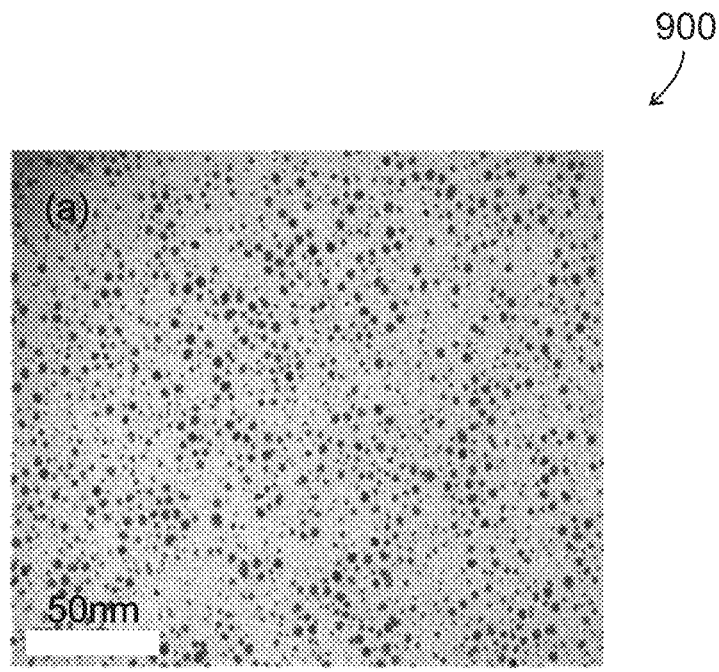
FIG. 9a is a transmission electron micrograph (TEM) depicting AuNP with average diameter 10 nm±3 nm.
Figure 9B:
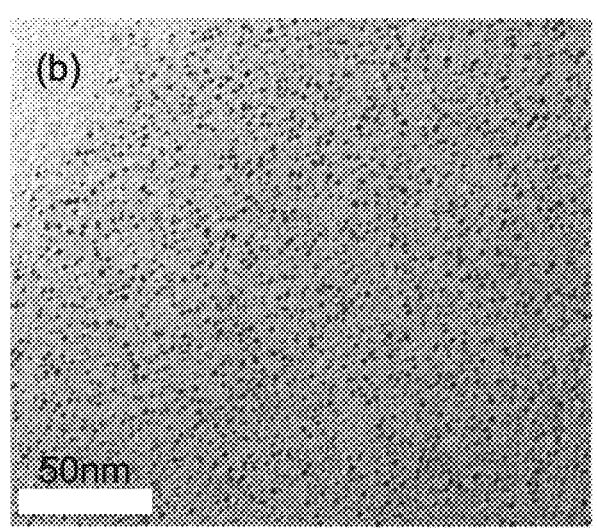
FIG. 9b is a transmission electron micrograph (TEM) depicting AuNP with average diameter 5 nm±1 nm.

FIGS. 9a and 9b are TEMs of nanoparticles produced according to various embodiments of the invention.

Average particle size in FIG. 9a (900) was 10 nm±3 nm (monodispersity 30%).

Average particle size in FIG. 9b (902) was 5 nm±1 nm (monodispersity 20%).

These particles were made by using a higher concentration of gold ions than in other examples shown herein, and using the higher ratio of gold ions to ligand agent. The concentration of gold ions was 31 mM, and the molar ratio of gold ions to CTAB, which was used as the ligand agent, was 10:1.

Example 7

Exemplary Nano-Rods

In order to demonstrate the ability to control particle shape, bi-ligand gold nanoparticles blocked with cetyltrimethylammonium bromide (CTAB) and ascorbic acid were prepared. The molar ratio was 3:1 for ascorbic acid:CTAB. Reaction time was 90 minutes at 75° C. It should be noted that ascorbic acid can function as a blocking agent (ligand agent) as well as functioning as a reducing agent, and CTAB can function both as a blocking agent and as a transfer agent.

Figure 10:
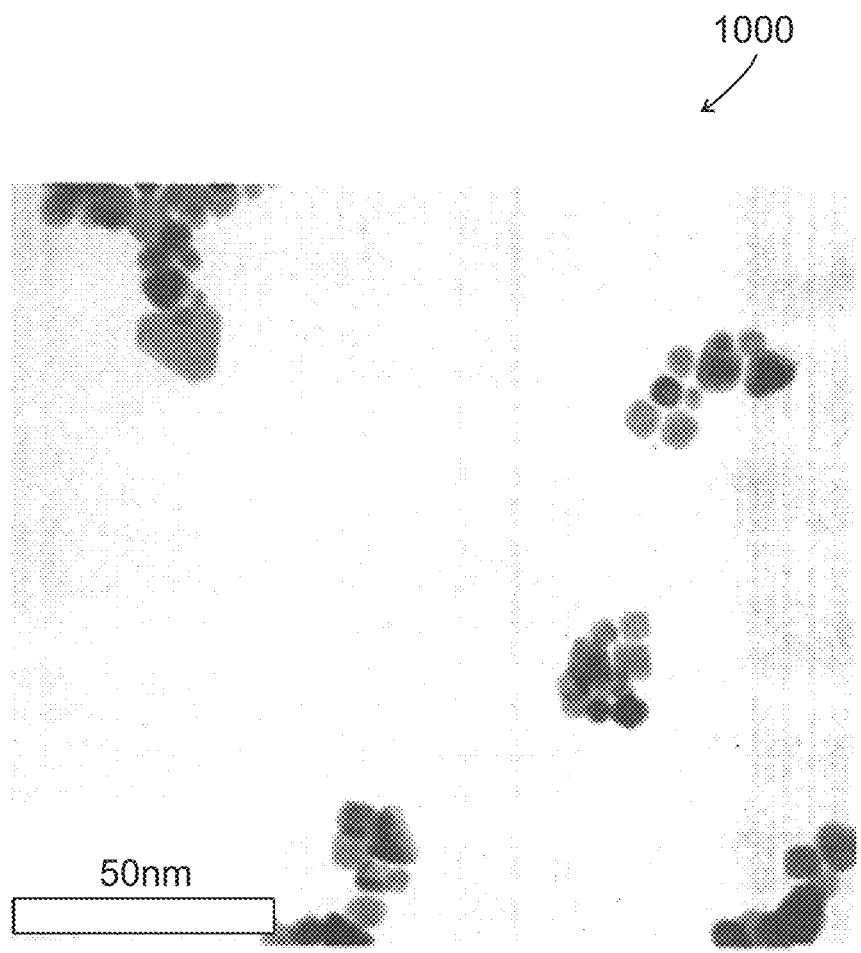
FIG. 10 is a transmission electron micrograph (TEM) depicting AuNP with rod and disk shapes.

FIG. 10 is a transmission electron micrograph (TEM) of the resultant rod shaped nanoparticles. Average particle size (length) was 25 nm±10 nm (monodispersity 40%).

This example demonstrates the insensitivity of the nanoparticle size and shape to temperature.

Nanorods as depicted here can be used to control the absorbance profile.

For example, a ratio of 4.5 (ratio between the diameter and the length) can absorb 750-950 nm. Other ratios such as 2.5 and 7.5 absorb 650-750 nm and 950-1200 nm respectively.

It is believed that by increasing the ascorbic acid:CTAB ratio beyond 3 nanowires can be produced.

Example 8

Factor Affecting Size and Shape of Nanoparticles

A study was made of the factors affecting the size and shape of gold nanoparticles. The chemicals used were hydrogen tetrachloroaurate trihydrate ($HAuCl_4 \cdot 3H_2O$, 99%), tetraoctylammonium bromide (TOAB, 99%), Sodium borohydride ($NaBH_4$, 99%), dodecylamine (DA), purchased from Sigma-Aldrich.

To synthesize nanoparticles of 5 nm diameter, $2.53 \times 10^{-4}$ mol (0.1 gr) of $HAuCl_4 \cdot 3H_2O$ was dissolved in 8 mL of water for 1 min. The aqueous phase was executed using $8.96 \times 10^{-4}$ mol (0.49 gr) of TOABr in toluene (27 ml) for 10 min with stirring at 1200 rpm. Then, the phases were separated and the organic phase was kept under ice temperature (4° C.). Three different sets of ligands were used for different batches of nanoparticles. In the first case, only an amine ligand agent, dodecylamine (DA), was used, in a 1:1 molar ratio with the gold ions. In the second case, two different ligands were used, the amine ligand agent DA, and a thiol ligand agent trifluoromethylbenzenethiol (TFMBT), with a Au:DA:TFMBT molar ratio of 1:0.9:0.1. In the third case, DA was used together with another thiol ligand agent, 2-amino-4-chlorobenzenethiol (ACBT), with a Au:DA:ACBT molar ratio of 1:0.9:0.1. In all three cases, $3.3 \times 10^{-3}$ mol (0.127 gr) of $NaBH_4$ was dissolved in 8 ml water and cooled down to 0° C. Thereafter, the $NaBH_4$ solution was rapidly added (all of the 8 ml in 2 to 3 sec) to the cooled gold ion solution. To get monodisperse nanoparticles, the reaction was allowed to occur under vigorous stirring (1200 rpm) at ice temperature for 3 hours. The phases were separated and the solvent was removed by slow rotary evaporation at room temperature and followed by multiple washing using 50 ml of cold ethanol (10° C.). After the first wash, the solution was kept at 5° C. for 18 hours until all remaining $NaBH_4$ was dissolved in the ethanol. Finally, the solvent was evaporated and the NP were immersed in 20 ml of toluene and kept at 15° C. for further use.

In contrast to the gold nanoparticles produced by Brust et al, cited above, using only thiol ligands, it appears that the gold nanoparticles produced by this method, with both thiol and amine ligands, begin growing immediately (within 10 seconds) after seed nanoparticles are formed when the reducing agent is added. This may make the nanoparticles more uniform in size. The inventors have found that good results are obtained when the concentrations and relative quantities of gold ions, transfer agent, ligand agents, and reducing agent are close to the values given above.

Figure 11:
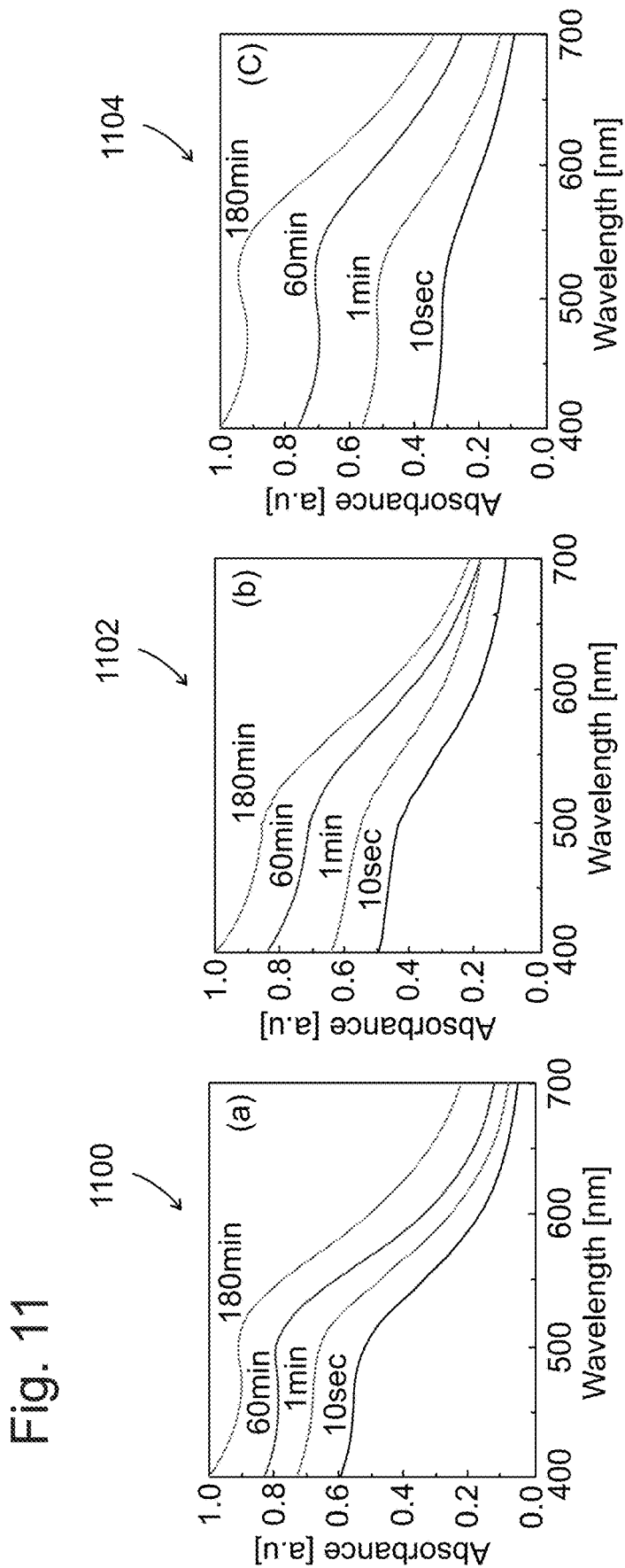
FIG. 11 shows three schematic plots of the absorption profiles gold nanoparticles made using different types of ligands.
Figure 12:
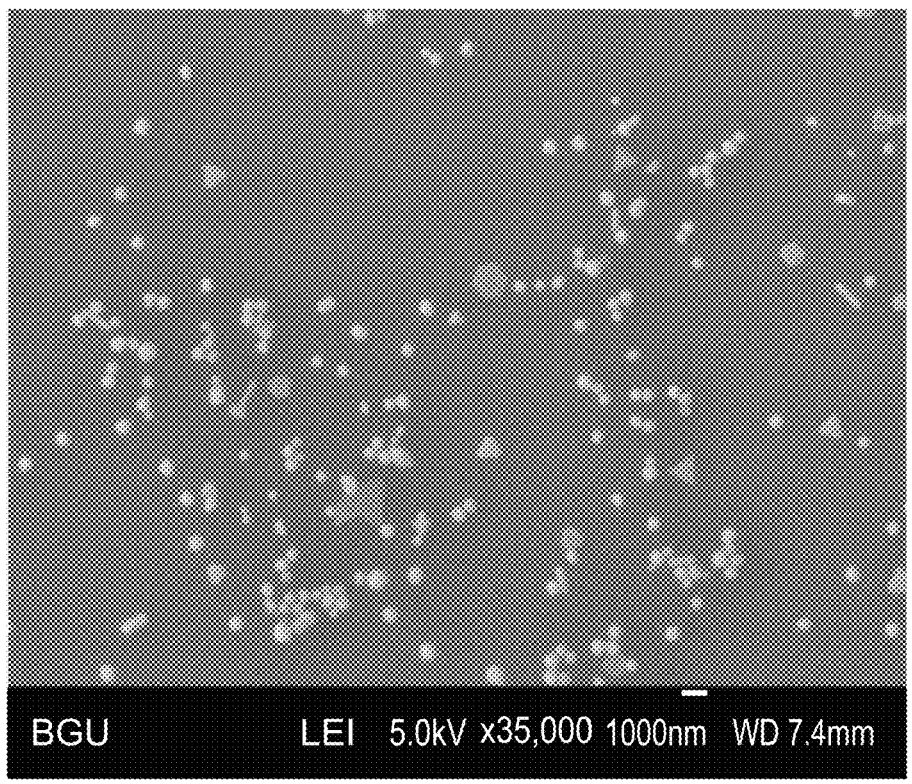
FIG. 12 is micrograph showing gold nanoparticles with a large range of sizes and shapes, prepared using aniline as a reducing agent, at a molar ratio of 1:1 to the gold ions, reduced at room temperature.
Figure 13:
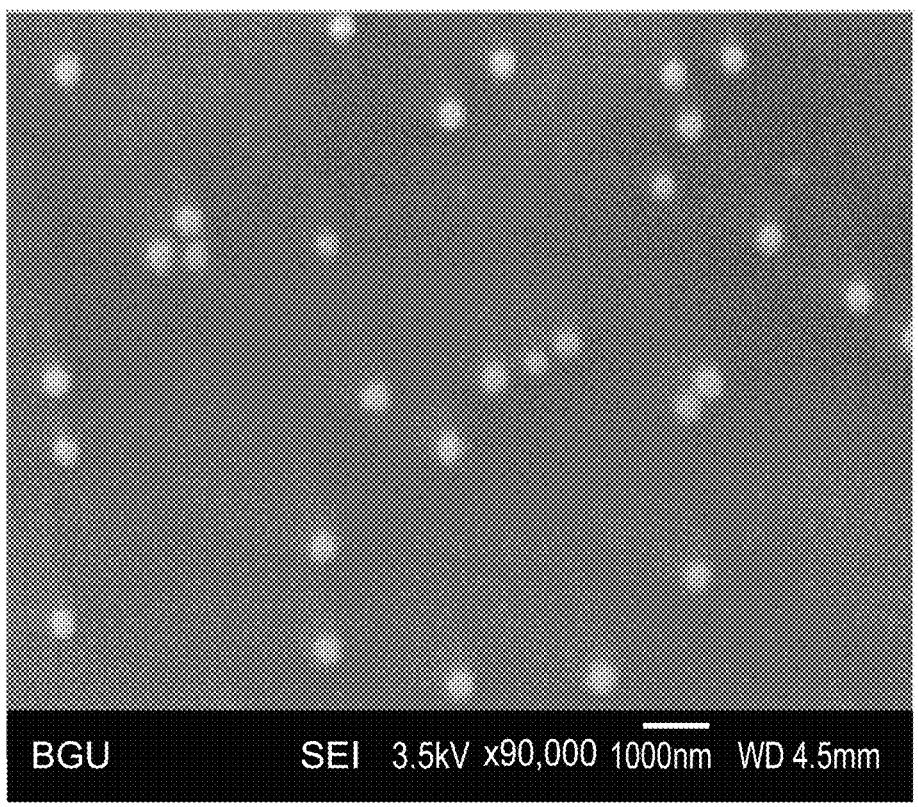
FIG. 13 is a micrograph showing gold nanoparticles that are all close to spherical with a narrow range of diameters.

FIG. 11 respectively show absorption profiles 1100, 1102 and 1104, in arbitrary units, for the three different cases of ligands: DA only, DA and TFMBT, DA and ACBT, The uniformity in size of the gold nanoparticles prepared with two different ligands may also be seen in transmission electron micrograph (TEM) images directly showing the nanoparticles. FIG. 13 shows an image of gold nanoparticles that were prepared using DA and TFMBT as ligand agents, and $NaBH_4$ as a reducing agent, and as can be seen, they are all spherical and are uniform in size. FIG. 12, by contrast, shows an image of gold nanoparticles prepared using aniline as a reducing agent, and they are very variable in size and shape.

Significant differences are seen in the three cases shown in FIG. 11. For each case, the absorption profile was measured at 10 seconds, 1 minute, 60 minutes, and 180 minutes after adding the reducing agent. The large change in absorption profile between 10 seconds and 1 minute shows that the nanoparticles started growing at almost the same time, no more than 10 seconds after the reducing agent was added. The uniformity in size may be seen from the relatively sharp peak, about 50 nm wide, in the absorption profiles shown in plots 1100, 1102, and 1104. It should be noted that there were also some unreduced gold ions remaining in the solution, after the nanoparticles were formed, and these gold ions have an absorption profile that peaks in the UV, below 400 nm, so the peak in the absorption by the nanoparticles appears in the plots as a shoulder on the gold ion absorption profile.

Monodisperse nanoparticles can be explained by LaMer's model for nucleation and growth of nanoparticles, described for example by Polte, cited above. In this model, all the nanoparticles nucleate at the same time and grow to the same size by the diffusion of species from the solution towards the particle surface. In the second step, the growth was very slow and took three hours of reaction time. During this step, the AuNP size increased slowly with increased reaction time as more material was added to the AuNPs surface, and spherical NP with 5 nm diameter were formed.

After three hours of reaction time, the phases (the water and the organic) were separated, and the organic phase was evaporated and dissolved in 20 mL of toluene and saved under low temperature (below 18° C.) as explained above. Specifically: during the nucleation stage, 0-10 sec, broader and low absorbance showed at 488±1 nm which indicates formation of a few Au seeds with heterogeneous size. However, when the reaction proceeds further, 10 sec to 180 min, higher absorbance is observed (more AuNP are formed) and the peak becomes narrower which indicates the specific growth mechanism to obtain monodisperse AuNPs. Interestingly, the Plasmon's spectra are red-shifted to 500±5 nm after 1 min (shift of 12 nm from the nucleation stage), and gradually red-shifted to 505±5 nm after 180 min (5 nm of shift during the whole growth stage) i.e. the seeds size increased to obtain uniform NP.

Table 2 shows the estimated size of the gold nanoparticles as a function of reaction time and type of ligand, based on the absorption profiles seen in FIG. 11.

TABLE 2

Dependence of nanoparticle size on type of ligand and reaction time

| Type of ligand | Reaction time | Nanoparticle diameter |
| --- | --- | --- |
| DA only | 10 seconds | <1 nm |
| DA only | 1 minute | 1 nm |
| DA only | 60 minutes | 3 nm |
| DA only | 180 minutes | 5 nm |
| DA and TFMBT | 10 seconds | <1 nm |
| DA and TFMBT | 1 minute | 1 nm |
| DA and TFMBT | 60 minutes | 2 nm |
| DA and TFMBT | 180 minutes | 3 nm |
| DA and ACBT | 10 seconds | <1 nm |
| DA and ACBT | 1 minute | 2 nm |
| DA and ACBT | 60 minutes | 5 nm |
| DA and ACBT | 180 minutes | 5-10 nm |

Table 3 shows the dependence of gold nanoparticle size on reaction temperature, gold ion concentration, and reduction agent concentration, all for a reaction time of 180 minutes. The concentrations are shown relative to the concentrations used in the description above, and the other parameters are the same as for the description above.

TABLE 3

Dependence of nanoparticle diameter on temperature,
ion and reduction agent concentration

| Ion concentration | Reduction agent concentration | Reaction time | Reaction temp | Nanoparticle diameter |
|---|---|---|---|---|
| 1 | 1 | 180 | 0-20 | 5 nm |
| 1 | 2 | 180 | 0-20 | 3 nm |
| 1 | 10 | 180 | 0-20 | 2 nm |
| 1 | 1 | 180 | 50 | 10 nm |
| 1 | 1 | 180 | 100 or more | 50 nm, irreg. shape |
| 2 | 1 | 180 | 0-20 | 10 nm |

The inventors have found that generally, nanoparticles have the strongest and most reproducible absorption profiles when the nanoparticle diameter is between 5 and 22 nm, and the shape is spherical.

Example 9

Absorption Profile for Silver Nanoparticles

Silver nanoparticles were prepared by dissolving $2.53 \times 10^{-4}$ mol (0.1 gr) of $AgNO_3$ in 8 mL of water for 1 min. The aqueous phase was transferred to an organic solvent by adding it to $8.96 \times 10^{-4}$ mol (0.49 gr) of TOAB in toluene (27 ml) with vigorous stirring for 10 minutes. Then, the phases were separated (the aqueous phase should be completely clear) and the organic phase was kept under ice temperature, or at 4° C. To 4 ml toluene solution, we added $2.53 \times 10^{-4}$ mol (0.048 gr) of dodecylamine, under ice temperature and stirred for 30 min. Subsequently, the solution was mixed with $3.3 \times 10^{-3}$ mol (0.127 gr) of $NaBH_4$ which dissolved first in 8 ml water and cooled down to 0° C.

Figure 14:
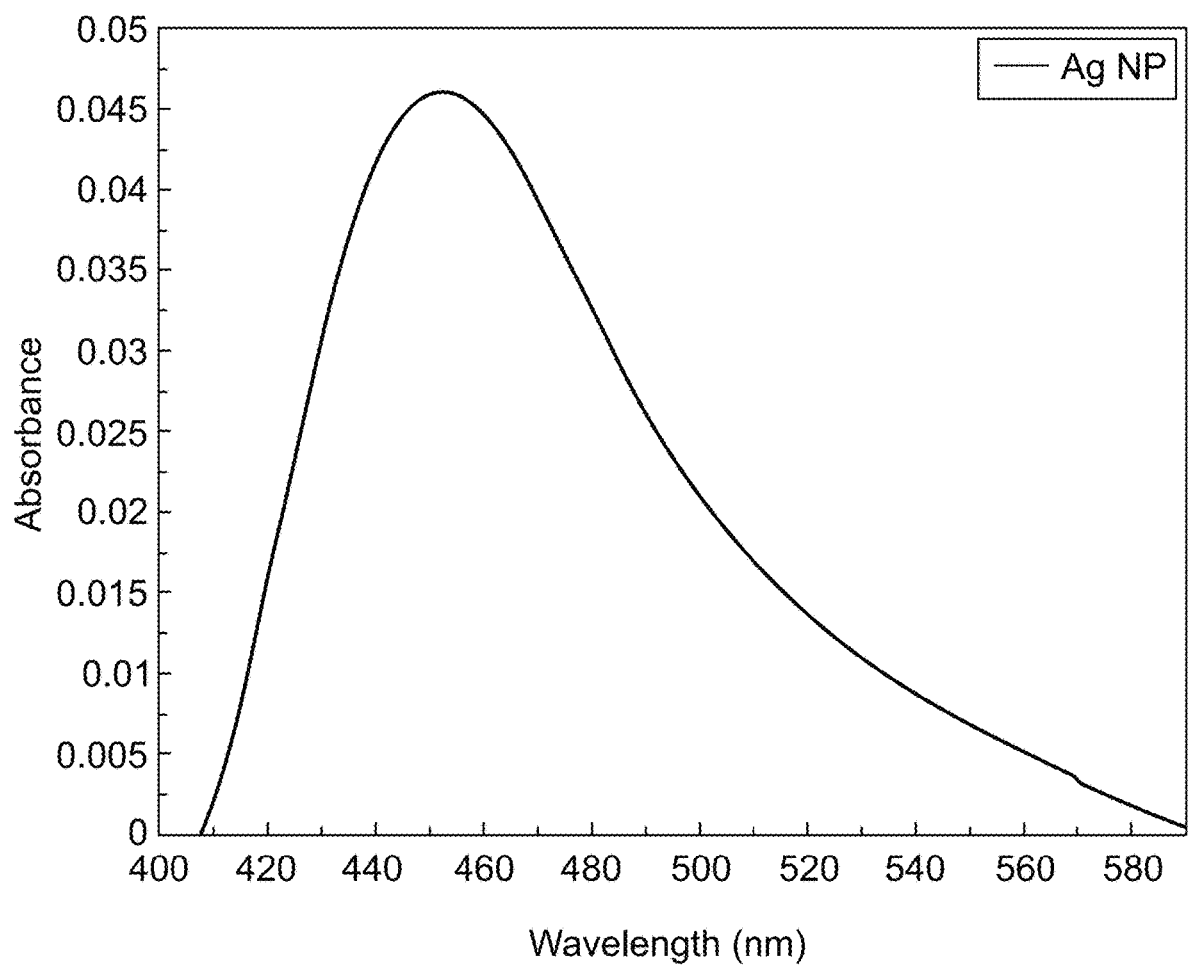
FIG. 14 is a schematic plot of an absorption profile for silver nanoparticles.

FIG. 14 shows the absorption profile that was measured for these silver nanoparticles, and it is expected to have dependence the ligand agents and other parameters similar to the gold nanoparticles. Unlike the absorbance profiles for gold nanoparticles seen in FIGS. 5A-B, 6A-B and 11, in which the absorbance peak is on the shoulder of a stronger absorbance peak below 400 nm due to gold ions that are also present, there were apparently not as many unreduced silver ions accompanying the silver nanoparticles, so a silver ion absorbance peak is not seen in FIG. 14.

Example 10

Dependence of Absorption Profile of Gold Ions on Ligands and Medium

Figure 15:
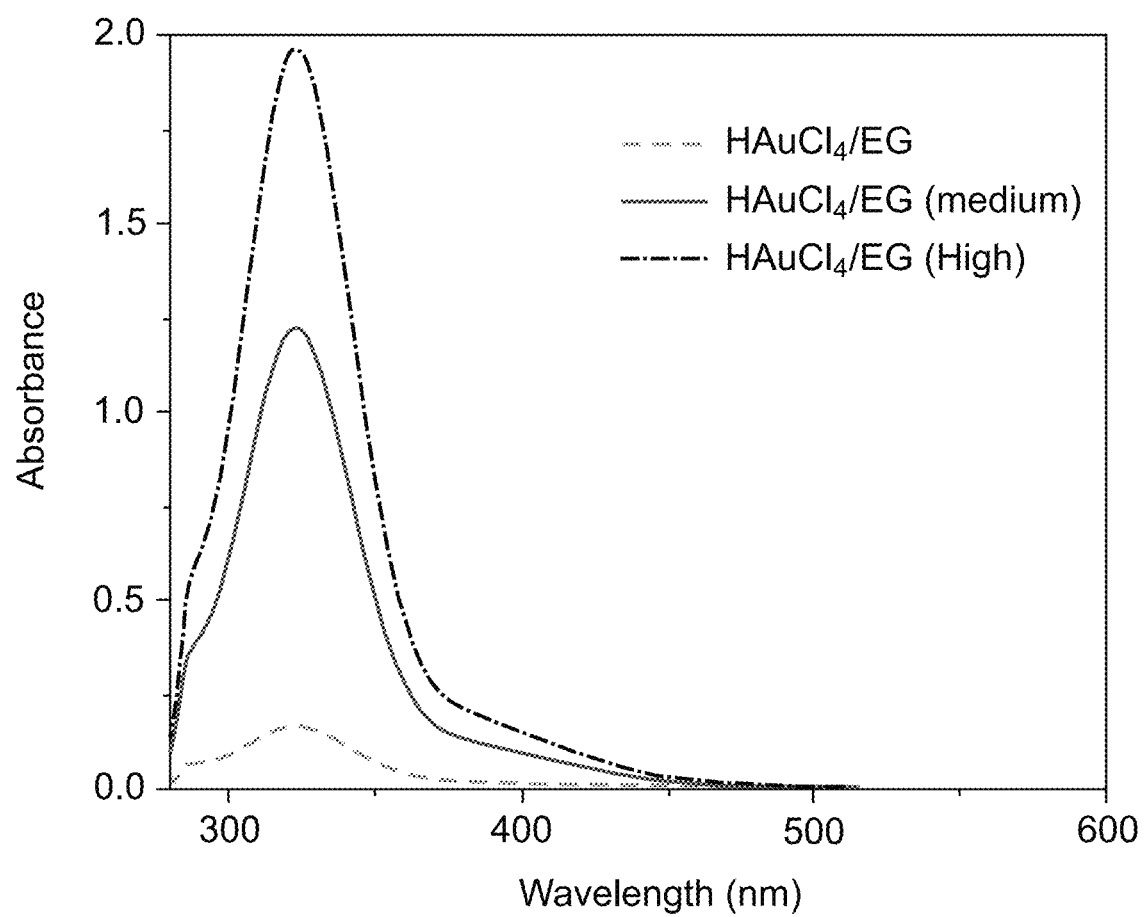
FIG. 15 is a schematic plot of absorption profiles for $AuCl_4$ ions in ethylene glycol.

FIG. 15 shows absorption profiles for gold ions, in the form of $HAuCl_4$, at different concentrations in ethylene glycol, 3.6 mM, 36 mM, and 360 mM. There is a prominent absorption peak centered at 320 nm, due to a strong ligand metal charge transfer transition, between the $AuCl_4^-$ ion and the ethylene glycol ligand.

Figure 16:
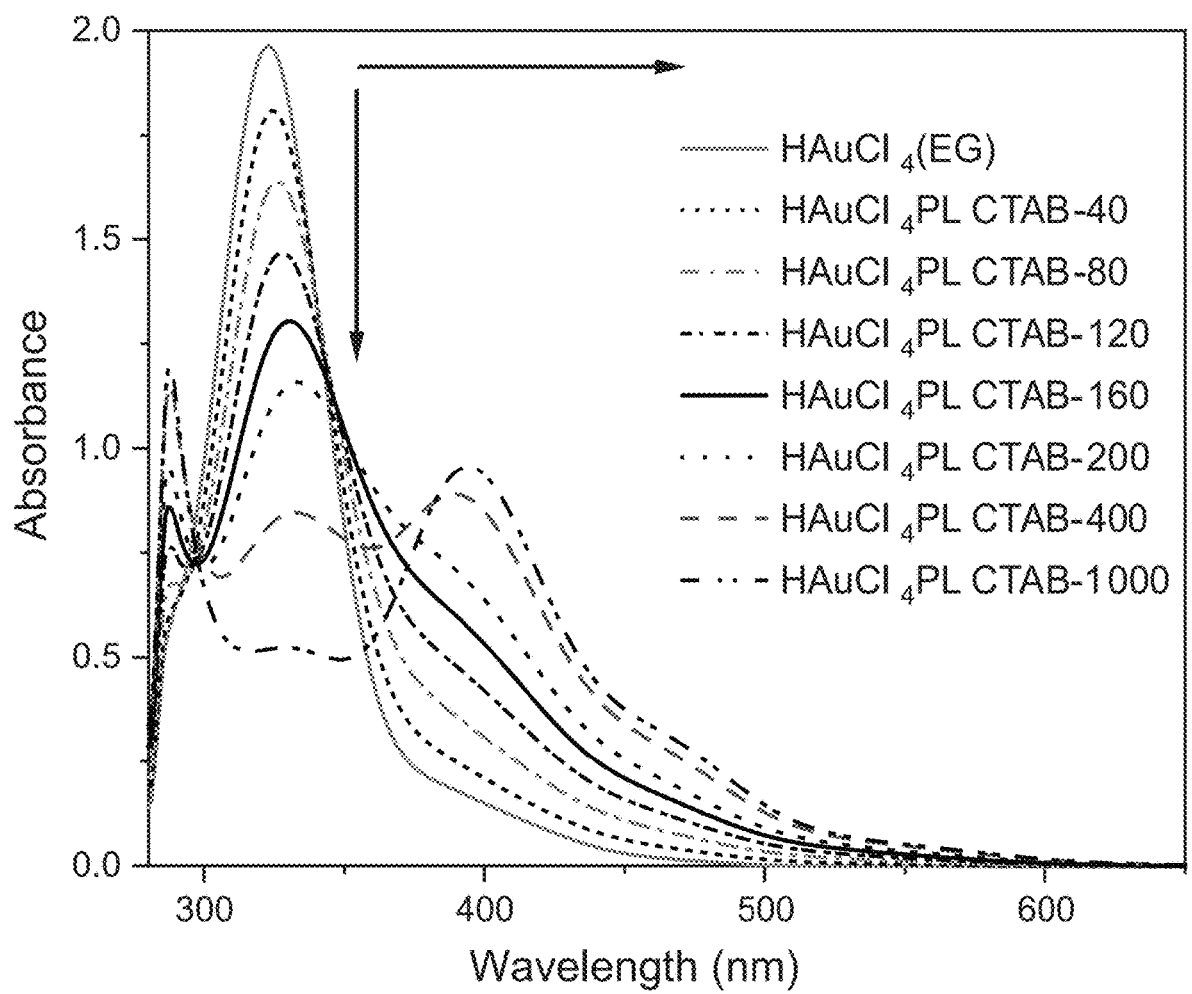
FIG. 16 is a schematic plot of absorption profiles for $AuCl_4$ ions in ethylene glycol, with different amounts of cetyltrimethylammonium bromide (CTAB) added.

FIG. 16 again shows the absorption profile for gold ions in ethylene glycol, and the absorption profile with increasing amounts of CTAB added. The volume of ethylene glycol with $HAuCl_4$ is 1000 µL, and absorption profiles are shown for 40 µL, 80 µL, 120 µL, 160 µL, 200 µL, 400 µL, and 1000 µL of a CTAB solution in ethylene gycol at the same molar concentration as the $HAuCl_4$. With no CTAB, there is a strong absorption peak at 320 nm, as in FIG. 15. As more and more CTAB is added, the peak at 320 nm becomes more depressed, and new peaks appear at about 285 nm and 400 nm, and with some absorption extending up to 500 nm. This shows that it is possible to get absorption over a broad range of wavelengths in the UV and visible using gold ions, and shows that it is possible to tune the absorption profile by adjusting the ligands attached to the gold ions.

Figure 17:
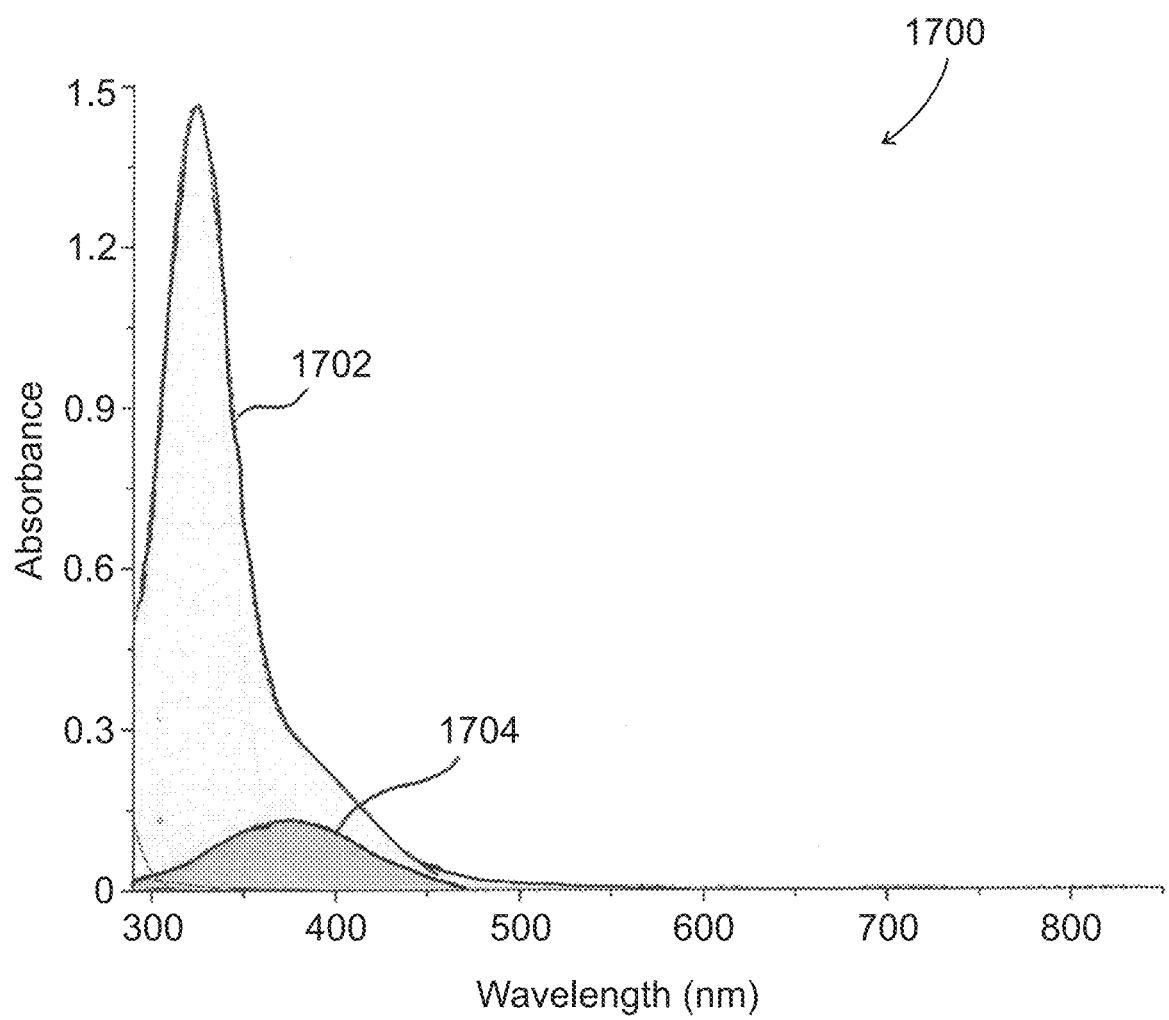
FIG. 17 is a schematic plot of an absorption profile of gold ions, showing two peaks that are caused by different mechanisms.

FIG. 17 shows a plot 1700 of an absorbance profile for gold ions. The main component 1702 of the absorbance profile is due to a strong ligand to metal charge transfer (LMCT) transition that has a peak around 320 nm, and there is a smaller component 1704, on the shoulder of component 1702, which has a peak at 370 nm, and is believed to be caused by a different mechanism. It is difficult to assign all absorption peaks of $[AuCl_4]^-$ ions due to the complications caused by the other absorption peaks which merge together. The broad shoulder at around 370 nm might correspond to d-d transition and/or spin forbidden LMCT transition. To study the ratio between the peaks during the redox reaction, $HAuCl_4$ was reduced by ascorbic acid (AA). The ratio between 320 nm and 370 nm is constant for different concentrations of $HAuCl_4$. But in the case of reduction of $HAuCl_4$ by ascorbic acid (AA), the peak intensity reduced gradually because of the reduction, but the peak ratio is changing due to the formation of gold nanoparticles, which increase the base absorption of the system. Since the 370 nm peak is less intense this change in the reaction affects the intensity considerably. Therefore, in a redox reaction solution, the ratio of the heights of the peaks at 320 and 370 nm is not constant, but the error is considerably less.

Example 11

Absorption Profile for Silver Ions

Figure 18:
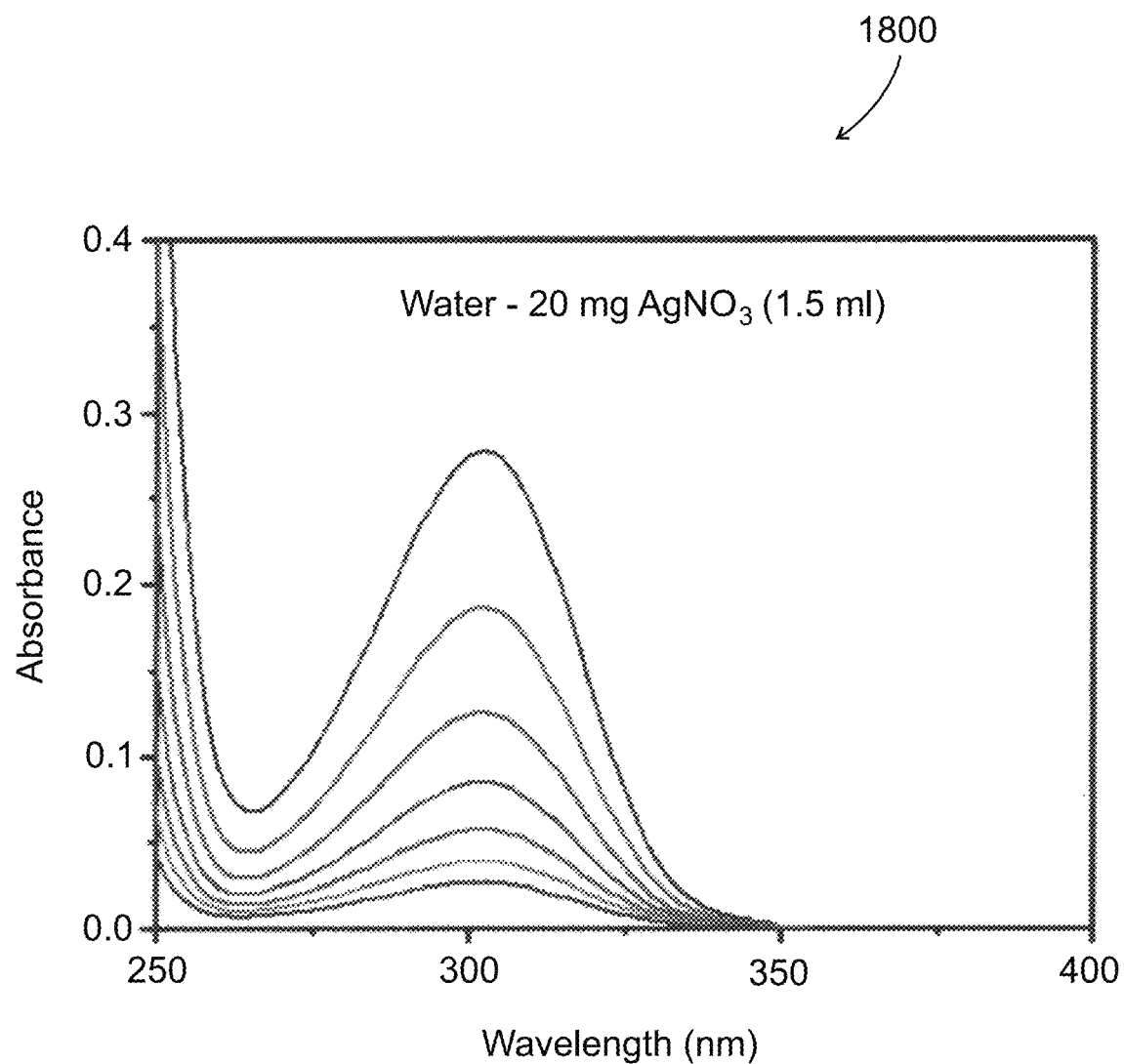
FIG. 18 is a schematic plot of an absorption profile for silver ions, in the form of $AgNO_3$, in water.

FIG. 18 shows a plot 1800 of an absorption profile for silver ions, with 20 mg of $AgNO_3$ dissolved in 1.5 mL of water. It has a peak at 300 nm. The strong absorption seen near 250 nm is not due to the silver ions, but to the glass of the container. The absorption profile is almost the same for silver ions in ethanol and in ethylene glycol, showing that the absorption is not affected very much by interactions with the medium.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of diffusing one or more of gold nanoparticles, silver nanoparticles, gold ions, and silver ions, into a solid transparent material, the material being a plastic, causing it to absorb at least some wavelengths of visible light, UV light, or both, the method comprising:

(a) providing a first volume of organic solvent with one or more of gold nanoparticles, silver nanoparticles, gold ions and silver ions, blocked with one or more amine or thiol ligands, suspended in the organic solvent;

(b) adding a quantity of the first volume of organic solvent to a volume of water and immersing the transparent material in the volume of water with the organic solvent added to it, or adding a quantity of the first volume of organic solvent to a volume of water with the transparent material immersed in it, such that there are a total of at least $3 \times 10^{-9}$ moles of gold and/or silver as ions and/or nanoparticles added per liter of water; and (c) heating the volume of water to at least 50 degrees C. with the added organic solvent and the transparent material for a period of time of at least 5 minutes to cause the one or more of gold nanoparticles, silver nanoparticles, gold ions and silver ions to diffuse into the transparent material to cause the transparent material to absorb light at at least some wavelengths of visible light, UV light, or both.

2. A method according to claim 1, comprising, after providing the first volume of organic solvent and performing (b) and (c) with it a first time;

(e) providing a second volume of organic solvent with one or more of gold nanoparticles, silver nanoparticles, gold ions and silver ions, blocked with one or more amine or thiol ligands, suspended in the organic solvent; and (f) performing (b) and (c) a second time, with the second volume of organic solvent.

3. A method according to claim 2, wherein one of the volumes of organic solvent has gold nanoparticles but consists essentially of no silver nanoparticles suspended in it, and the other one of the volumes of organic solvent has silver nanoparticles but consists essentially of no gold nanoparticles suspended in it, thereby reducing an incidence of gold nanoparticles touching silver nanoparticles when they are embedded in the transparent material, and reducing an effect of charge transfer between gold nanoparticles and silver nanoparticles that are touching each other when they are embedded in the transparent material and are exposed to light of a wavelength that would be absorbed by both the gold and silver nanoparticles.

4. A method according to claim 1, wherein providing the first volume of organic solvent comprises providing the first volume of organic solvent with at least one or both of gold nanoparticles and silver nanoparticles suspended in it, and heating the volume of water causes the one or both of gold nanoparticles and silver nanoparticles to diffuse into the transparent material.

5. A method according to claim 1, for processing a solid transparent material so that it absorbs UV light according to an absorption profile, wherein the one or more of gold nanoparticles, silver nanoparticles, gold ions and silver ions comprises one or more of gold ions and silver ions, and providing the first volume of organic solvent comprises:

(a) providing an aqueous solution of ions comprising gold, ions comprising silver, or both;

(b) transferring the ions from the aqueous solution to the organic solvent using a transfer agent; and (c) blocking the ions with the one or more ligand agents; and wherein adding the quantity of the first volume of organic solvent to the volume of water comprises adding the quantity of the first volume of organic solvent with the blocked ions to the volume of water, and heating the volume of water with the added organic solvent and the transparent material causes the one or more of gold ions and silver ions to diffuse into the transparent material.

6. A method according to claim 5, also comprising selecting the one or more ligand agents, and selecting a ratio of concentration of ligand agents if there is more than one, so that the absorption profile has specified characteristics.

7. A method according to claim 5, where the ions comprise both gold ions and silver ions.

8. A method according to claim 5, also comprising adding gold or silver nanoparticles, or both, to the volume of water that the organic solvent with the ions is added to, before heating the volume of water with the added organic solvent and the transparent material, causing the nanoparticles to diffuse into the transparent material together with the ions; or adding the nanoparticles to a volume of water and heating the water with the added nanoparticles with the transparent material immersed in it over a different period of time, causing the nanoparticles to diffuse into the transparent material.

9. A method according to claim 5, to process the transparent material so that it absorbs visible light as well as UV, the method also comprising, after blocking the ions and before adding the organic solvent with the ions to the volume of water:

(a) adding a solution comprising one or more reducing agents to the organic solvent with the blocked ions;

(b) stirring together the solution with the reducing agents, and the organic solvent with the ions, for a reaction time between 1 minute and 3 hours to reduce some but not all of the ions to nanoparticles; and (c) separating the organic solvent with the nanoparticles and the remaining ions from the solution with the reducing agents, after the reaction time;

wherein adding the quantity of organic solvent to the volume of water adds a quantity of the nanoparticles to the water, and heating the water with the added organic solvent also causes the nanoparticles to diffuse into the transparent material.

10. A method according to claim 9, wherein blocking the ions with one or more ligand agents comprises blocking the ions with at least two ligand agents by:

a) blocking a first portion of the ions, in the organic solvent in a first container, with a first one of the ligand agents;

b) blocking a second portion of the ions, in the organic solvent in a second container, separate from the first container, with a second one of the ligand agents; and c) mixing the ions blocked with the first ligand agent in a single container together with the ions blocked with the second ligand agent, before reducing the blocked ions to form the nanoparticles.

11. A method according to claim 5, also comprising rapidly stirring the aqueous solution with the ions in it, at more than 300 rpm for more than 10 minutes, to reduce agglomeration of the ions.

12. A method according to claim 1, wherein the transparent material comprises a lens.

13. A method according to claim 1, wherein heating the volume of water with the added organic solvent comprises heating the volume of water with the added organic solvent to a temperature no greater than 100 degrees Celsius.

14. A method according to claim 1, wherein the period of time is sufficient to cause the one or more of gold nanoparticles, silver nanoparticles, gold ions and silver ions to diffuse into the transparent material in an amount sufficient for the ions to absorb at least 10% of the light passing through the material in at least one direction, for at least one wavelength between 400 and 550 nm, or for the nanoparticles to absorb at least 15% of the light passing through the material in at least one direction, for at least one wavelength between 400 and 550 nm, or both.

* * * * *